United States Patent
Boyd

(10) Patent No.: US 10,720,091 B2
(45) Date of Patent: Jul. 21, 2020

(54) CONTENT MASTERING WITH AN ENERGY-PRESERVING BLOOM OPERATOR DURING PLAYBACK OF HIGH DYNAMIC RANGE VIDEO

(71) Applicant: Microsoft Technology Licensing, LLC, Redmond, WA (US)

(72) Inventor: Charles N. Boyd, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 52 days.

(21) Appl. No.: 15/435,154

(22) Filed: Feb. 16, 2017

(65) Prior Publication Data

US 2018/0233075 A1    Aug. 16, 2018

(51) Int. Cl.
*G09G 3/20*     (2006.01)
*G09G 5/10*     (2006.01)
(Continued)

(52) U.S. Cl.
CPC ........... *G09G 3/2003* (2013.01); *G06T 5/008* (2013.01); *G06T 5/20* (2013.01); *G09G 5/10* (2013.01);
(Continued)

(58) Field of Classification Search
None
See application file for complete search history.

(56) References Cited

U.S. PATENT DOCUMENTS 7,932,914 B1 *   4/2011   Geiss ..................... G09G 5/393
                                                                 345/555
9,064,313 B2     6/2015   Seshadrinathan et al.
(Continued)

FOREIGN PATENT DOCUMENTS

CN          1870055          11/2006

OTHER PUBLICATIONS

Benjamin Guthier, Stephan Kopf, Marc Eble, Wolfgang Effelsberg, Flicker Reduction in Tone Mapped High Dynamic Range Video, 2011, Proceedings of SPIE 7866, Color Imaging XVI: Displaying, Processing, Hardcopy, and Applications, 78660C, pp. 1-15 (Year: 2011).*

(Continued)

*Primary Examiner* — Michael J Cobb
(74) *Attorney, Agent, or Firm* — Klarquist Sparkman, LLP

(57) ABSTRACT

Innovations in content mastering operations performed during playback of high dynamic range ("HDR") video on a display device are described. When content mastering is performed during playback on a display device, a video playback system can use details retained for input HDR video (e.g., retained in metadata) and the properties of the display device to improve the perceptual quality of the HDR video as shown on that display device. For example, the video playback system can use an energy-preserving bloom operator to make bright highlights "bloom" into adjacent areas, thereby accentuating the bright highlights in the HDR video while operating within the constraints of the display device. The video playback system can also perform various other types of operations when content mastering is deferred until playback, including application of a lens flare operator as well as alternative tone mapping operators and alternative (Continued)

color gamut mapping operators selected according to metadata.

27 Claims, 6 Drawing Sheets

(51) Int. Cl.
| | |
|---|---|
| *H04N 9/82* | (2006.01) |
| *H04N 5/76* | (2006.01) |
| *H04L 29/06* | (2006.01) |
| *G06T 5/00* | (2006.01) |
| *G06T 5/20* | (2006.01) |
| *H04N 9/67* | (2006.01) |
| *H04N 9/64* | (2006.01) |
| *G09G 5/00* | (2006.01) |
| *H04N 5/20* | (2006.01) |
| *H04N 19/44* | (2014.01) |
| *G09G 5/02* | (2006.01) |

(52) U.S. Cl.
CPC .......... *H04L 65/604* (2013.01); *H04N 5/76* (2013.01); *H04N 9/646* (2013.01); *H04N 9/67* (2013.01); *H04N 9/8205* (2013.01); *H04N 19/44* (2014.11); *G06T 2207/10016* (2013.01); *G06T 2207/10024* (2013.01); *G06T 2207/20208* (2013.01); *G09G 5/005* (2013.01); *G09G 5/02* (2013.01); *G09G 2320/0233* (2013.01); *G09G 2320/0271* (2013.01); *G09G 2320/066* (2013.01); *G09G 2320/0666* (2013.01); *G09G 2320/0673* (2013.01); *G09G 2340/06* (2013.01); *G09G 2340/14* (2013.01); *G09G 2360/144* (2013.01); *G09G 2360/16* (2013.01); *G09G 2370/04* (2013.01); *H04N 5/20* (2013.01)

(56) References Cited

U.S. PATENT DOCUMENTS

| | | | |
|---|---|---|---|
| 9,300,714 B2 | 3/2016 | Bauer et al. | |
| 2009/0245333 A1* | 10/2009 | Krishnamoorthi | .......................... H04L 25/0202 375/219 |
| 2010/0088736 A1 | 4/2010 | Besen | |
| 2010/0277515 A1 | 11/2010 | Ward et al. | |
| 2010/0310189 A1* | 12/2010 | Wakazono | .............. G06T 5/008 382/258 |
| 2012/0120201 A1 | 5/2012 | Ward | |
| 2013/0038790 A1* | 2/2013 | Seetzen | ................... G09G 5/02 348/453 |
| 2013/0202204 A1* | 8/2013 | Yamanaka | .............. G06T 5/003 382/167 |
| 2013/0329778 A1* | 12/2013 | Su | ......................... H04N 19/126 375/240.01 |
| 2014/0160148 A1 | 6/2014 | Barkett et al. | |
| 2014/0307117 A1* | 10/2014 | Feng | .................... H04N 5/2355 348/218.1 |
| 2015/0067514 A1* | 3/2015 | Lewis | ................. G11B 27/031 715/720 |
| 2016/0021391 A1* | 1/2016 | Su | .......................... H04N 19/86 375/240.12 |
| 2016/0100147 A1 | 4/2016 | Kim et al. | |
| 2016/0210730 A1 | 7/2016 | Eto et al. | |
| 2016/0212329 A1 | 7/2016 | Choe et al. | |
| 2016/0360212 A1* | 12/2016 | Dai | ...................... H04N 19/186 |
| 2018/0276801 A1* | 9/2018 | Stessen | .................... H04N 9/64 |
| 2018/0352257 A1* | 12/2018 | Leleannec | ................. G06T 5/10 |
| 2019/0279581 A1* | 9/2019 | Furuta | ................. G02F 1/13471 |

OTHER PUBLICATIONS

Matthias Hullin, Elmar Eisemann, Hans-Peter Seidel, Sungkil Lee, Physically-Based Real-Time Lens Flare Rendering, 2011, ACM Transactions on Graphics, vol. 30, Issue 4, Article 108, pp. 1-9. (Year: 2011).*
Jamie Talbot, What are Bloom Filters?, 2015, retrieved from <<https://blog.medium.com/what-are-bloom-filters-1ec2a50c68ff>>, accessed Sep. 3, 2018 (Year: 2015).*
Google Search, Bloom Operator, Bloom Filter Example and Energy-Preserving Bloom Operator, 2018, retrieved from <<www.google.com>>, accessed Aug. 24, 2018 (Year: 2018).*
Bing Search, Bloom Operator, Bloom Filter Example and Energy-Preserving Bloom Operator, 2018, retrieved from <<www.google.com>>, accessed Aug. 24, 2018 (Year: 2018).*
Charilaos Kalogirou, "How to do Good Bloom for HDR Rendering," 2006, retrieved from "(http://kalogirou.net/2006/05/20/how-to-do-good-bloom-for-hdr-rendering/) ", accessed Dec. 9, 2019 (Year: 2006).*
Anderson et al., "Jump: Virtual Reality Video," *ACM Trans. on Graphics*, vol. 35, Issue 6, 13 pp. (Dec. 2016).
Android, "HDR Video Playback," downloaded from the World Wide Web, 9 pp. (document not dated—downloaded on Feb. 2, 2017).
Aydin et al., "Temporally Coherent Local Tone Mapping of HDR Video," *ACM Trans. on Graphics*, vol. 33, No. 6, 13 pp. (Nov. 2014).
Carmona, "Dolby Vision 101: Intro to Dynamic Metadata," downloaded from the World Wide Web, 6 pp. (Jul. 2016).
Dolby Vision, "Dolby Vision™ for the Home," White Paper, 12 pp. (2016).
Guthier et al., "A Real-Time System for Capturing HDR Videos," *ACM Int'l Conf. on Multimedia*, pp. 1473-1476 (Oct. 2012).
Hagemeier, "UHD with High Dynamic Range (HDR) Application Note," 15 pp. (Aug. 2015).
Mantiuk et al., "Perception-motivated High Dynamic Range Video Encoding," *ACM Trans. on Graphics*, vol. 23, No. 3, 9 pp. (Aug. 2004).
Meylan et al., "High Dynamic Range Image Rendering With a Retinex-Based Adaptive Filter," *IEEE Trans. on Image Processing*, vol. 15, No. 9, pp. 2820-2830 (Sep. 2009).
Rempel et al., "Video Viewing Preferences for HDR Displays Under Varying Ambient Illumination," *Symp. on Applied Perception in Graphics and Visualization*, pp. 45-52 (Sep. 2009).
Wikipedia, "Dolby Laboratories," 9 pp. (document last modified Feb. 1, 2017).
Wikipedia, "High-Dynamic-Range Rendering," 8 pp. (document last modified Jul. 26, 2016).
Wikipedia, "High-Dynamic-Range Video," 7 pp. (document last modified Jan. 27, 2017).
Chiu et al., "Spatially Nonuniform Scaling Functions for High Contrast Images," *Graphics Interface Proc.*, pp. 245-254 (May 1993).
International Search Report and Written Opinion dated May 7, 2018, from International Patent Application No. PCT/US2018/016938, 18 pp.
Spencer et al., "Physically-Based Glare Effects for Digital Images," *SIGGRAPH Conf.*, pp. 325-334 (Sep. 1995).

* cited by examiner software 180 implementing one or more innovations for performing content mastering operations during playback of HDR video

CONTENT MASTERING WITH AN ENERGY-PRESERVING BLOOM OPERATOR DURING PLAYBACK OF HIGH DYNAMIC RANGE VIDEO

BACKGROUND

When video is streamed over the Internet and played back through a Web browser or media player, the video is delivered in digital form. Digital video is also used when video is delivered through many broadcast services, satellite services and cable television services. Real-time videoconferencing often uses digital video, and digital video is used during video capture with most smartphones, Web cameras and other video capture devices.

For standard dynamic range ("SDR"), digital video represents common colors in a relatively narrow range of brightness. Brightness can be measured in candelas per square meter ($cd/m^2$), which indicates luminous intensity per unit area. This unit of luminous intensity per unit area is called a "nit." A typical SDR display device may represent colors from pale colors through colors that are relatively vivid, in a brightness range from 0 nits to 100 nits. More recently, display devices having high dynamic range ("HDR") have been introduced. A typical HDR display device may represent colors in a wider color gamut (potentially representing colors that are more vivid or saturated) and in a larger brightness range (e.g., up to 1500 nits or 4000 nits). Video produced for playback on an HDR display device can have an even larger brightness range (e.g., 0 nits to 10,000 nits).

In a conventional production chain for HDR video processing, after input HDR video is captured using a camera or set of cameras, one or more production tools perform "content mastering" operations on the input HDR video. The content mastering process allows an editor to adjust dynamic range, average brightness, contrast, color tone, and/or other attributes of the HDR video for artistic effect or to improve quality of the HDR video as perceived by a viewer. The dynamic range and color gamut of the input HDR video are typically reduced. After content mastering operations, the HDR video is encoded. The encoded HDR video is distributed in any of various ways (e.g., streaming over a network, broadcast, via disk media). A video playback system receives the encoded HDR video, decodes the HDR video, and renders sample values of the HDR video for display on a display device. During the rendering process, the video playback system typically makes additional adjustments to the sample values of the HDR video, e.g., to adapt to the peak brightness of the display device and/or user settings.

Typically, content mastering operations in such a production chain attempt to optimize HDR video for display on a reference display device in a reference viewing environment. The reference viewing environment is a hypothetical viewing environment (e.g., one that assumes the HDR video will be played back in a dark room). The reference display device is a hypothetical display device, which has capabilities based on assumptions about the display device that will actually be used to play back the HDR video. Often, the reference display device is assumed to have a peak brightness that is typical for an HDR display device (e.g., 1000 nits, 1500 nits). During content mastering for a reference display device, details in bright sample values of HDR video may be lost. For example, if the peak brightness of the reference display device is 1500 nits, bright sample values above 1500 nits may clipped (that is, set to 1500 nits), or bright sample values above a certain threshold value (such as 1400 nits) may be compressed to a very small range. Such loss of details for bright highlights of HDR video due to content mastering operations can adversely affect the quality of the viewing experience, even if the display device used to play back the HDR video matches the reference display device.

SUMMARY

In summary, the detailed description presents innovations in content mastering operations performed during playback of high dynamic range ("HDR") video on a display device. Content mastering operations before encoding can be skipped, or at least retain details about bright highlights in the HDR video (e.g., with metadata associated with encoded data for the HDR video). The bright highlights may include sample values that exceed the peak brightness of the display device that is later used during playback. As part of content mastering operations during playback on a display device, a video playback system can use an energy-preserving bloom operator to make the bright highlights "bloom" into adjacent areas, thereby accentuating the bright highlights in the HDR video while operating within the constraints of the display device that is actually used for playback. Differences in brightness between highlights can be conveyed to a viewer through different degrees of the blooming effect, even when all of the highlights were outside the range of the display device that is actually used for playback. The video playback system can also perform various other types of operations when content mastering is performed during playback, including application of a lens flare operator as well as alternative tone mapping operators and/or alternative color gamut mapping operators. Thus, when content mastering is performed during playback on a display device, a video playback system can use details retained for input HDR video (e.g., retained in metadata), preferences specified by a content provider (e.g., specified in metadata), and the properties of the display device (such as the peak brightness of the display device) to improve the perceptual quality of the HDR video as shown on that display device.

According to one aspect of the innovations described herein, a computer system includes one or more processing units, memory, and a display device. The computer system implements a video playback system, which includes a set of one or more buffers, one or more HDR video recovery modules, and a renderer. The set of buffer(s) is configured to receive encoded data for a picture of HDR video and to receive metadata. For example, the set of buffer(s) includes an input buffer that receives a media stream or file with the encoded data and the metadata, which are subsequently separated. Alternatively, different buffers can receive different streams/files for the encoded data and the metadata. The HDR video recovery module(s) are configured to use the encoded data and at least some of the metadata to reconstruct sample values of the picture of HDR video. The renderer is configured to perform content mastering on the sample values of the picture of HDR video. In particular, the renderer is configured to apply an energy-preserving bloom operator to high-intensity values, if any, for the sample values of the picture of HDR video. When high-intensity values are too bright to display on a given display device, the energy-preserving bloom operator can "spread" the energy of the high-intensity values so that bright highlights are more realistically rendered for display on the display device.

For example, the HDR video recovery module(s) can include a splitter, a metadata parser, a video decoder, and a composer. For configurations in which a media stream or file includes both the encoded data and the metadata, the splitter can be configured to separate, from the media stream/file, the encoded data from the metadata. The metadata parser can be configured to parse syntax elements of the metadata, and thereby retrieve a first set of parameters (indicating properties of the picture of HDR video) and second set of parameters (indicating preferences for the content mastering). The video decoder can be configured to decode the encoded data, and thereby produce base sample values. The composer can be configured to adjust the base sample values according to the first set parameters, and thereby reconstruct the sample values of the picture of HDR video. Alternatively, if the encoded data and metadata are provided separately, the HDR video recovery module(s) can include a metadata parser, a video decoder, and a composer, which are configured as described above. Or, if the metadata is provided along with encoded data in a video elementary bitstream, with details preserved in sample values of the encoded data, the HDR video recovery module(s) can include a video decoder, which is configured to reconstruct the sample values of the picture of HDR video.

In some example implementations, to apply the energy-preserving bloom operator to the high-intensity values, the renderer can be configured to identify the high-intensity values from among input values for the sample values of the picture of HDR video. For example, the renderer is configured to, for each of the input values, compare the input value to a bloom threshold and, if the input value satisfies the bloom threshold, designate the input value as one of the high-intensity values. The bloom threshold can depend at least in part on the peak brightness of the display device. After the high-intensity values are identified, the renderer can apply the bloom operator to overflow values for the identified high-intensity values to produce adjustment values. Typically, the bloom operator blurs the overflow values. The bloom operator can be implemented as a filter (e.g., Gaussian smoothing filter), which spreads the energy of the overflow values to values adjacent the identified high-intensity values. Finally, the renderer can merge the adjustment values into the picture of HDR video.

The renderer can be configured to perform other operations for the content mastering, such as performing exposure correction, applying a lens flare operator, performing tone mapping with a tone mapping operator selected from among multiple available tone mapping operators, and/or performing color gamut mapping with a color gamut remapping operator selected from among multiple available color gamut remapping operators. Metadata can be used to adjust such content mastering operations. For example, syntax elements in such metadata define a set of parameters that indicate preferences for the content mastering, including: (a) a lens flare style or type for the lens flare operator; (b) a lens flare intensity, size, and/or density for the lens flare operator; (c) a strength value, size, and/or density for the bloom operator; (d) a tone mapping operator selected from among multiple available tone mapping operators; and/or (e) a color gamut remapping operator selected from among multiple available color gamut remapping operators. Depending on implementation, these various types of content mastering operations can be performed in different orders.

The innovations can be implemented as part of a method, as part of a computer system configured to perform operations for the method, or as part of one or more computer-readable media storing computer-executable instructions for causing a computer system to perform the operations for the method. The various innovations can be used in combination or separately. This summary is provided to introduce a selection of concepts in a simplified form that are further described below in the detailed description. This summary is not intended to identify key features or essential features of the claimed subject matter, nor is it intended to be used to limit the scope of the claimed subject matter. The foregoing and other objects, features, and advantages of the invention will become more apparent from the following detailed description, which proceeds with reference to the accompanying figures.

DETAILED DESCRIPTION

Figure 1:
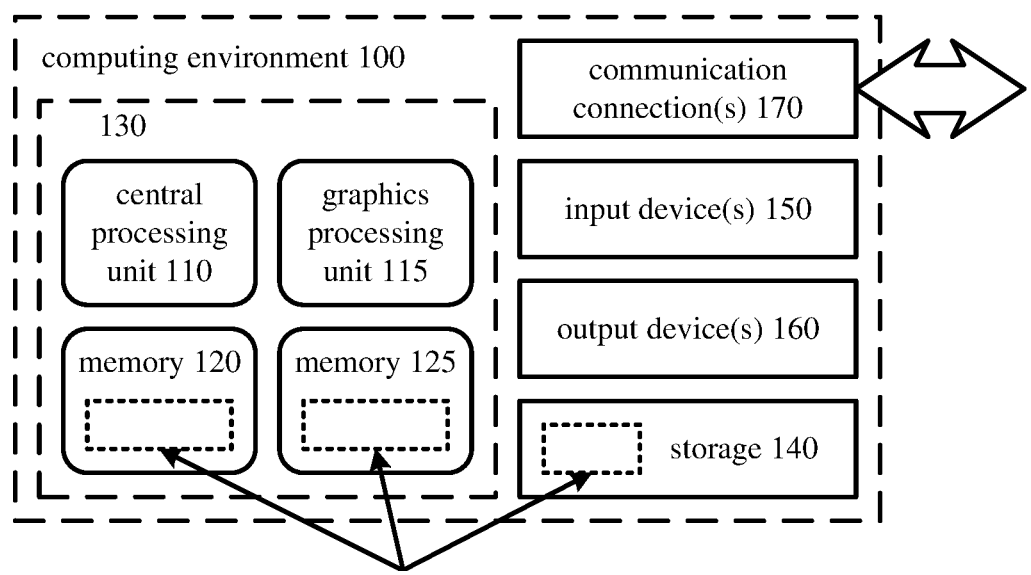
FIG. 1 is a diagram illustrating an example computer system in which some described embodiments can be implemented.

In a conventional production chain for processing high dynamic range ("HDR") video, input HDR video is captured using a camera or set of cameras. After that, one or more production tools perform content mastering operations on the input HDR video. In general, the content mastering process allows an editor to adjust dynamic range, average brightness, contrast, color tone, and/or other attributes of the HDR video for artistic effect or to improve quality of the HDR video as perceived by a viewer. The content mastering operations can include exposure correction, application of a lens flare operator to simulate effects such as halos or streaking around bright highlights, color gamut mapping operations, and/or tone mapping operations. The dynamic range and color gamut of the input HDR video are typically reduced. HDR video may be mastered for a reference display device having a peak brightness such as 2000 nits, 1500 nits, or lower, which can cause loss of details for bright highlights in the HDR video. In particular, conventionally, content mastering operations performed before encoding do not preserve energy of high-intensity values for bright highlights. After content mastering operations, the HDR video is encoded. The encoded HDR video is distributed in any of various ways (e.g., streaming over a network, broadcast, via disk media). A video playback system receives the encoded HDR video, decodes the HDR video, and renders sample values of the HDR video for display on a display device. The loss of details for bright highlights of HDR video due to content mastering operations at the production side can adversely affect the quality of the viewing experience.

In other approaches, during content mastering operations on input HDR video, although the dynamic range and color gamut of the input HDR video are reduced (e.g., for playback on an SDR display device), metadata is provided to recover a version of the input HDR video with higher dynamic range and wider color gamut. The encoded video and metadata (preserving details of the input HDR video) are distributed. After receiving the encoded video and metadata, a video playback system can reconstruct a version the input HDR video and render sample values of the HDR video for display on a display device. During the rendering process, the video playback system typically makes additional adjustments to the sample values of the HDR video, e.g., to adapt to the peak brightness of the display device. Such approaches fail to provide support for many types of adjustments to the sample values of the HDR video, however, which can adversely affect the quality of the viewing experience.

The detailed description presents innovations in content mastering operations performed during playback of HDR video on a display device. Content mastering operations before encoding can be skipped or performed in a "scalable" way, such that details of the HDR video (e.g., details about bright highlights) are retained throughout encoding and distribution of the encoded HDR video (e.g., retained in metadata associated with the encoded HDR video). Then, during playback on a display device, a video playback system can perform various types of content mastering operations appropriate in view of the capabilities of the display device and details retained for input HDR video (e.g., retained in metadata). For example, bright highlights in the HDR video that is encoded and distributed may include sample values that exceed the peak brightness of the display device used during playback. The video playback system can use an energy-preserving bloom operator to make the bright highlights "bloom" into adjacent areas. While operating within the constraints of the display device, the blooming effect can accentuate differences between bright highlights in the HDR video, even when all of the highlights were outside the range of the display device. This can accurately simulate the reaction of a camera or the human visual system as it processes bright highlights, which improves the realism of the rendering process. Thus, when content mastering is performed during playback on a display device, a video playback system can use details retained in the HDR video, preferences specified by a content provider, and the properties of the display device (such as the peak brightness of the display device) to improve the perceptual quality of the HDR video as shown on that display device. Aside from using an energy-preserving bloom operator, the video playback system can perform various other types of operations when content mastering is performed during playback, including application of a lens flare operator as well as alternative tone mapping operators and alternative color gamut mapping operators selected according to preferences specified by a content provider (e.g., in metadata).

Using one or more of the innovations described herein, a content provider can perform content mastering operations during video playback. For playback, the content provider can provide a renderer as part of an application (or use a renderer provided by another party) to perform content mastering operations appropriate for the actual display device that will be used to display HDR video. In this way, the content provider can potentially retain creative control over content mastering operations further down the production chain, even considering the capabilities of the actual display device that will be used during playback.

In some example implementations, to perform content mastering operations during playback of HDR video, a video playback system uses rendering technology provided as part of a game console or graphics library. In some cases, the rendering technology can accept HDR video with very high brightness (e.g., 5M nits peak brightness or higher). High-intensity values for bright highlights can be scaled based on the capabilities of the actual display device that will be used to during playback, using an energy-preserving bloom operator to enhance realism.

In many of the examples described herein, content mastering operations are skipped before encoding, or content mastering operations are scalably performed before encoding. Content mastering operations are then performed during playback. Alternatively, at least some conventional content mastering operations can be performed in a non-scalable way before encoding, while retaining at least some details of HDR video (e.g., for bright highlights), and content mastering operations are again performed during playback.

In the examples described herein, identical reference numbers in different figures indicate an identical component, module, or operation. Depending on context, a given component or module may accept a different type of information as input and/or produce a different type of information as output. More generally, various alternatives to the examples described herein are possible. For example, some of the methods described herein can be altered by changing the ordering of the method acts described, by splitting, repeating, or omitting certain method acts, etc. The various aspects of the disclosed technology can be used in combination or separately. Some of the innovations described herein address one or more of the problems noted in the background. Typically, a given technique/tool does not solve all such problems.

I. Example Computer Systems.

FIG. 1 illustrates a generalized example of a suitable computer system (100) in which several of the described innovations may be implemented. The computer system (100) is not intended to suggest any limitation as to scope of use or functionality, as the innovations may be implemented in diverse general-purpose or special-purpose computer systems.

With reference to FIG. 1, the computer system (100) includes one or more processing units (110, 115) and memory (120, 125). The processing units (110, 115) execute computer-executable instructions. A processing unit can be a general-purpose central processing unit ("CPU"), processor in an application-specific integrated circuit ("ASIC") or any other type of processor. In a multi-processing system, multiple processing units execute computer-executable instructions to increase processing power. For example, FIG. 1 shows a CPU (110) as well as a GPU (115). In general, the GPU (115) is any specialized circuit, different from the CPU (110), that accelerates creation and/or manipulation of image data in a graphics pipeline. The GPU (115) can be implemented as part of a dedicated graphics card (video card), as part of a motherboard, as part of a system on a chip ("SoC"), or in some other way (even on the same die as the CPU (110)).

The tangible memory (120, 125) may be volatile memory (e.g., registers, cache, RAM), non-volatile memory (e.g., ROM, EEPROM, flash memory, etc.), or some combination of the two, accessible by the processing unit(s). In FIG. 1, the memory (120) is CPU memory, accessible to the CPU (110), and the memory (125) is GPU memory, accessible to the GPU (115). Depending on architecture (e.g., whether the GPU (115) is part of a video card, motherboard, or SoC), the CPU memory can be completely separate from the GPU memory, or the CPU memory and GPU memory can, at least in part, be shared memory or drawn from the same source (e.g., RAM). The memory (120, 125) stores software (180) implementing one or more innovations for performing content mastering operations during playback of HDR video, in the form of computer-executable instructions suitable for execution by the processing unit(s).

A computer system may have additional features. For example, the computer system (100) includes storage (140), one or more input devices (150), one or more output devices (160), and one or more communication connections (170). An interconnection mechanism (not shown) such as a bus, controller, or network interconnects the components of the computer system (100). Typically, operating system ("OS") software (not shown) provides an operating environment for other software executing in the computer system (100), and coordinates activities of the components of the computer system (100).

The tangible storage (140) may be removable or non-removable, and includes magnetic storage media such as magnetic disks, magnetic tapes or cassettes, optical storage media such as CD-ROMs or DVDs, or any other medium which can be used to store information and which can be accessed within the computer system (100). The storage (140) can store instructions for the software (180) implementing one or more innovations, as described herein, for performing content mastering operations during playback of HDR video.

The input device(s) (150) may be a touch input device such as a keyboard, mouse, pen, or trackball, a voice input device, a scanning device, or another device that provides input to the computer system (100). For video, the input device(s) (150) may be a camera, video card, screen capture module, TV tuner card, or similar device that accepts video input in analog or digital form, or a CD-ROM or CD-RW that reads video input into the computer system (100). The output device(s) (160) may be a computer monitor, television screen, or other display device, printer, speaker, CD-writer, or another device that provides output from the computer system (100).

The communication connection(s) (170) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-readable media. Computer-readable media are any available tangible media that can be accessed within a computing environment. By way of example, and not limitation, with the computer system (100), computer-readable media include memory (120, 125), storage (140), and combinations thereof. As used herein, the term computer-readable media does not include transitory signals or propagating carrier waves.

The innovations can be described in the general context of computer-executable instructions, such as those included in program modules, being executed in a computer system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computer system.

The terms "system" and "device" are used interchangeably herein. Unless the context clearly indicates otherwise, neither term implies any limitation on a type of computer system or computer device. In general, a computer system or computer device can be local or distributed, and can include any combination of special-purpose hardware and/or general-purpose hardware with software implementing the functionality described herein.

For the sake of presentation, the detailed description uses terms like "determine" and "select" to describe computer operations in a computer system. These terms denote operations performed by a computer, and should not be confused with acts performed by a human being. The actual computer operations corresponding to these terms vary depending on implementation.

As used herein, the term "send" denotes any way of conveying information from one component or module to another component/module, and the term "receive" denotes any way of getting information at one component/module from another component/module. The two components/modules can be part of the same computer system or different computer systems. The information can be passed by value (e.g., as a parameter of a message or function call) or passed by reference (e.g., in a buffer). Depending on context, the information can be communicated directly between the two components/modules or be conveyed through one or more intermediate components/modules. As used herein, the term "connected" denotes an operable communication link between two components/modules, which can be part of the same computer system or different computer systems. The operable communication link can be a wired or wireless network connection, which can be direct or pass through one or more intermediate components/modules (e.g., of a network).

II. Example Formats for HDR Video.

HDR video can be organized in any of various formats, which may vary in terms of bits per sample value, dynamic range, and color gamut. For example, an HDR video format can use 10 bits per sample value, 12 bits per sample value, or some other number of bits per sample value. The dynamic range of sample values in an HDR video format can be 0 nits to 1000 nits, 0 nits to 1500 nits, 0 nits to 4000 nits, 0 nits to 10000 nits, or some other dynamic range. Typically, the peak brightness for an HDR video format is at least 1000 nits. For example, for the HDR-10 format, the peak brightness is 10000 nits. As another example, for the ACES format, the peak brightness is 5M nits. With respect to color gamut, HDR video typically has a wider color gamut than standard dynamic range ("SDR") video, which means the HDR video can potentially represent colors that are more saturated, or vivid. For some HDR video formats, the color gamut effectively spans the full range of the human visual system.

The spatial resolution of HDR video can be 720p (1280 sample values×720 sample values), 1080p (1920 sample values×1080 sample values), UHD (3840 sample values×2160 sample values), or some other number of sample values per picture. In general, a pixel is the set of one or more collocated sample values for a location in a picture, which may be arranged in different ways for different chroma sampling formats. Typically, before encoding, the sample values of video are converted to a color space such as YUV, in which sample values of a luma (Y) component represent brightness or intensity values, and sample values of chroma (U, V) components represent chroma values. The precise definitions of the chroma values (and conversion operations between a YUV-type color space and another color space such as an RGB-type color space) depend on implementation. In general, as used herein, the term YUV-type color space indicates any color space with a luma (or luminance) component and one or more chroma (or chrominance) components, including Y' UV, YIQ, Y' IQ and YDbDr as well as variations such as YCbCr and YCoCg. Chroma sample values may be sub-sampled to a lower chroma sampling rate (e.g., for a YUV 4:2:0 format) in order to reduce the spatial resolution of chroma sample values, or the chroma sample values may have the same resolution as the luma sample values (e.g., for a YUV 4:4:4 format). The term RGB-type color space indicates a color space that includes R, G, and B components in any order, which may be the color space used for a display device.

In some example implementations, HDR video has 10 bits per sample value (e.g., HDR-10 format). The sample values are in a YUV-type color space with 4:2:0 chroma sampling format. Sample values are organized as a Y plane followed by an interleaved U/V plane with 2×2 subsampling. In other example implementations, HDR video has 12 bits per sample value, and the sample values are in a YUV-type color space with 4:2:0 chroma sampling format. In still other example implementations, HDR video has 12 bits per sample values, and the sample values are in an intermediate color space such as IPT (see below) with 4:2:0 chroma sampling format.

When image content is created for video, the signal captured by a camera (or multiple cameras, for some approaches to capturing HDR video) is converted from an optical signal to an electrical signal using an opto-electrical transfer function ("OETF"). In an example OETF, output values are assigned to input brightness values (in nits). For HDR video, one goal of the OETF is to maintain dynamic range and wide color gamut. Several OETFs have been described in format specifications, including S-Log 3, ST 2084, and HLG.

Figure 2:
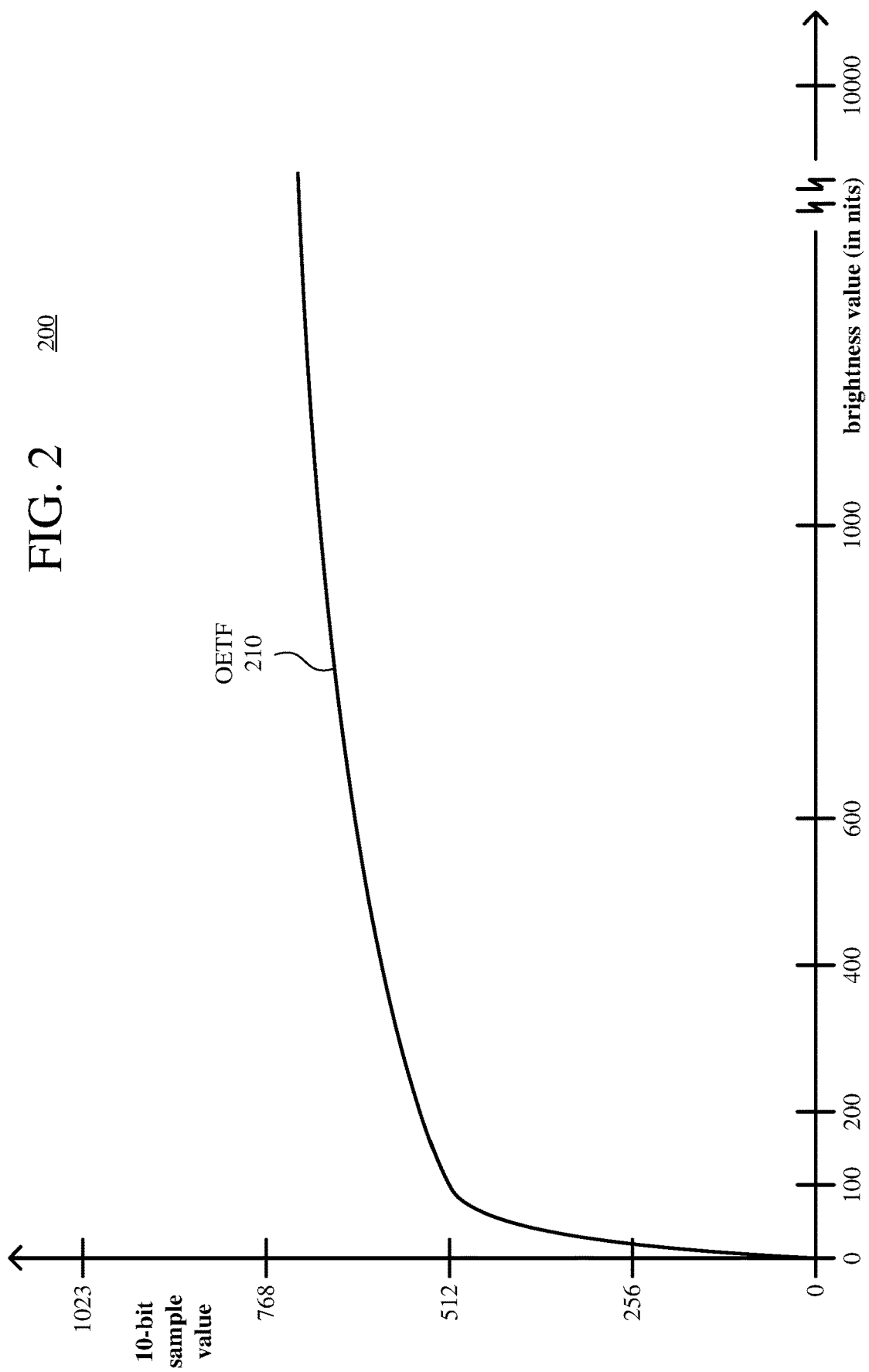
FIG. 2 is a diagram illustrating an example opto-electrical transfer function for HDR video.

FIG. 2 shows an example (200) that includes an OETF (210) for HDR video. In the example (200), output values are 10-bit sample values, for a range of 0 to 1023. Input values are brightness values in the range of 0 nits to 10000 nits. For the OETF (210), a relatively small range of input values up to a peak brightness for SDR video (e.g., from 0 nits to 100 nits) is assigned to a significant proportion of the range for output values (e.g., from 0 to 511). Within this range, dark sample values (e.g., from 0 nits to 2 nits) are represented with very fine gradations of output values (e.g., 0 to 200). This is an example of range expansion. A range of input values is assigned to a larger range of output values, which helps preserve details of dark sample values during later processing such as encoding.

Input values above the peak brightness for SDR video (e.g., above 100 nits) are assigned to the remaining range of output values (e.g., from 512 to 1023), with gradations between input values (per step in output value) becoming progressively wider as brightness values increase. For example, input values from 101 nits to 400 nits are assigned to output values in the range of 512 to 640, input values from 401 nits to 2000 nits are assigned to output values in the range of 641 to 768, and input values from 2001 nits to 10000 nits are assigned to output values in the range of 769 to 1023. The 1000 input values that are brightest (from 9000 nits to 10000 nits) may be represented with very small range of output values (e.g., 1014 to 1023). This is an example of range compression. A range of input values is assigned to a smaller range of output values, which helps preserve some details of bright sample values during later processing such as encoding, with more details being preserved for less bright sample values.

III. Example Distribution Architectures for HDR Video.

Figure 3:
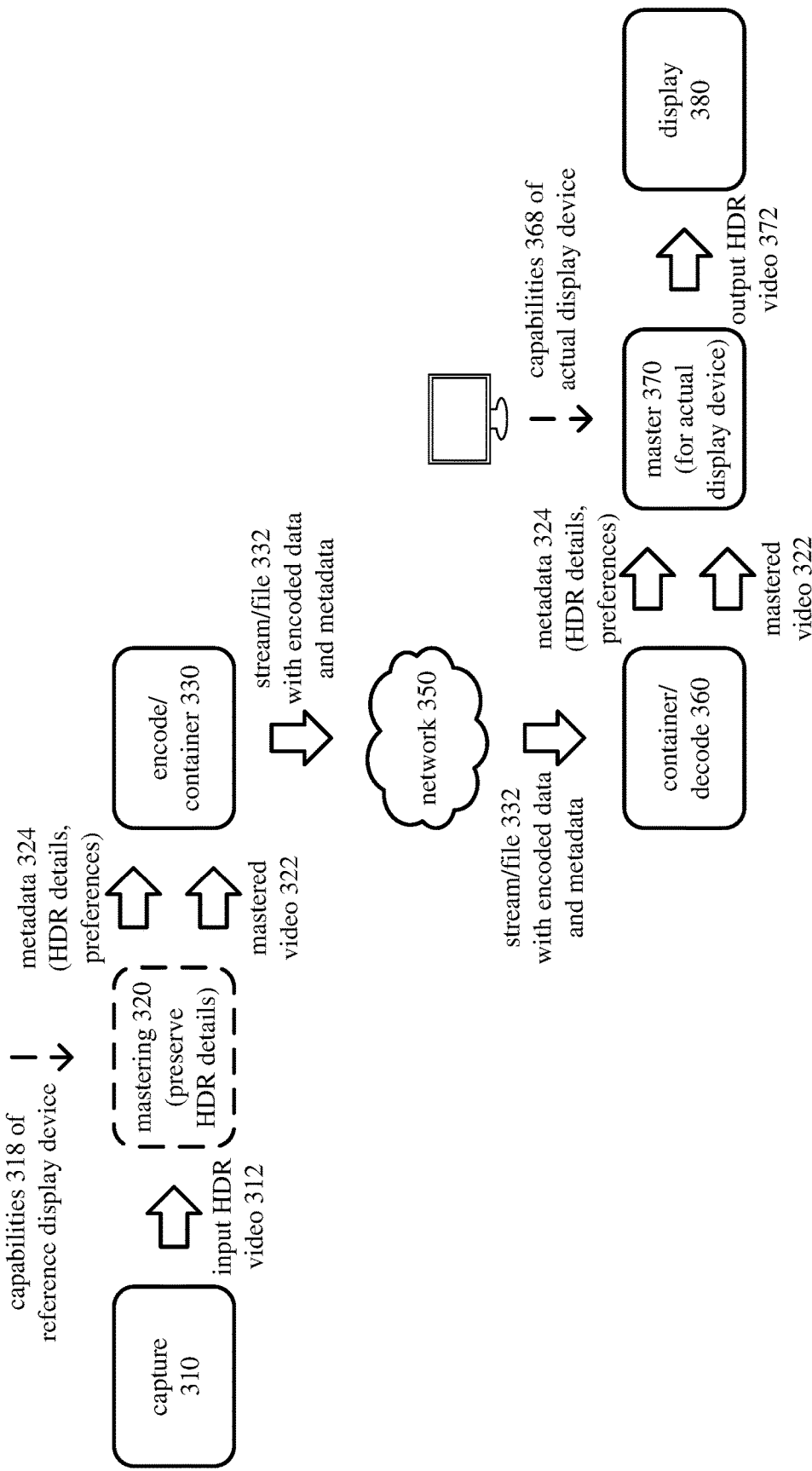
FIG. 3 is a diagram of an example distribution architecture in conjunction with which some described embodiments can be implemented.

FIG. 3 shows an example distribution architecture (300) in conjunction with which some described embodiments can be implemented. The example distribution architecture (300) includes production-side activities and playback-side activities.

During production, in a capture stage (310), HDR video is captured using a camera or set of multiple cameras. This produces a series of pictures of input HDR video (312), with each picture including sample values in an HDR video format. For example, the HDR video format can be a format as described in the previous section.

After input HDR video (312) is captured, one or more production tools can perform content mastering operations on the input HDR video (312). In the distribution architecture (300) shown in FIG. 3, "scalable" content mastering operations can be performed on the input HDR video (312) in a content mastering stage (320), or the content mastering stage (320) can be skipped. Conceptually, this in effect assumes an ideal reference display device. As a result, details of the input HDR video (312), especially high-intensity values for bright highlights of the input HDR video (312), are preserved. In particular, the content mastering operations can include exposure correction, tone mapping operations and/or color gamut mapping operations to optimize the HDR video for display on a reference display device in a reference viewing environment. Among various capabilities (318) of the reference display device considered during the content mastering stage (320), the reference display device is assumed to have a very high peak brightness (e.g., 4K nits, 8K nits, 10K nits, or higher). In the example of FIG. 3, the content mastering stage (320) produces sample values of content-mastered video (322) as well as metadata (324). The content-mastered video (322) can include "base" sample values with reduced dynamic range and reduced color gamut, which are adapted for display on a SDR display device. In the metadata (324), some syntax elements can indicate parameters that preserve HDR details of the input HDR video (312), details of the wide color gamut of the input HDR video (312), and details of other properties of the input HDR video (312), which can be used to adjust the base sample values and recover HDR details. In the metadata (324), other syntax elements can indicate parameters for preferences in content mastering operations during playback, such as a lens flare style or type for a lens flare operator, a lens flare intensity, size, and/or density for the lens flare operator, a strength value, size, and/or density for an energy-preserving bloom operator, a tone mapping operator selected from among multiple available tone mapping operators, and/or a color gamut remapping operator selected from among multiple available color gamut remapping operators. Alternatively, the content mastering stage (320) can produce sample values that retain HDR details, details of the wide color gamut of the input HDR video, and/or other details of the input HDR video, which are directly encoded. In any case, during the content mastering before encoding, details in bright sample values of HDR video are retained to a large extent.

After the content mastering stage (320), during an encode/container processing stage (330), the content-mastered HDR video (322) is encoded, and encoded data for the HDR video and the metadata (324) are put in a container format for transport. For example, encoding the content-mastered HDR video (322) can produce output compliant with the H.265/HEVC standard, ISO/IEC 14496-10 standard (also known as H.264/AVC), another standard, or a proprietary format such as VP9, or a variation or extension thereof. In FIG. 3, the output of the encode/container processing stage (330) is shown as a stream/file (332) with encoded data and metadata (324). The container processing can packetize and/or multiplex the encoded data along with the metadata (324) for transmission or storage as a media stream or file. More generally, the container processing can implement one or more media system multiplexing protocols or transport protocols.

The stream/file (332) (in a container format) is distributed over a network (350) using an appropriate communication protocol. The network (350) can include the Internet or another computer network. More generally, the stream/file (332) can be distributed in any of various ways (e.g., streaming over a network, broadcast, via disk media).

During playback, in a container processing/decode stage (360), encoded data for the HDR video is removed from the container format and decoded, producing base sample values of the pictures of content-mastered HDR video (322). The container processing can depacketize and/or demultiplex the encoded data along with the metadata (324) from the stream/file (332). More generally, the container processing can implement one or more media system demultiplexing protocols or transport protocols. Decoding the content-mastered HDR video (322) can follow the H.265/HEVC standard, ISO/IEC 14496-10 standard (also known as H.264/AVC), another standard, or a proprietary format such as VP9, or a variation or extension thereof.

After decoding (e.g., as a final part of the container processing/decode stage (360) or an initial part of a content mastering stage (370)), a version of the input HDR video (312) can be reconstructed using some of the metadata (324) and content-mastered HDR video (322). Some syntax elements in the metadata (324) indicate parameters that preserve HDR details of the input HDR video (312), details of the wide color gamut of the input HDR video (312), and details of other properties of the input HDR video (312). Such parameters/properties can be used to compose sample values of a reconstructed version of the input HDR video (312) from base sample values of content-mastered HDR video (322). This produces a series of pictures of the reconstructed version of HDR video, with each picture including sample values in the HDR video format used for the input HDR video (312). Alternatively, from a video elementary bitstream, a video decoder can produce sample values in which HDR details, details of the wide color gamut of the input HDR video, and/or other details of the input HDR video are directly represented (without subsequent operations to compose such sample values using metadata (324) from outside the video elementary bitstream that indicates parameters/properties of the input HDR video, but still using other metadata in the video elementary bitstream).

In any case, in a content mastering stage (370), content mastering operations are performed on the sample values of the pictures of HDR video, producing output HDR video (372). The content mastering operations can adjust dynamic range, average brightness, contrast, color tone, and/or other attributes of the HDR video in view of the capabilities (368) of the actual display device that will be used to display the HDR video. The capabilities (368) of the actual display device that are considered can include color gamut primary values of the display device, peak brightness of the display device, black level of the display device, and/or other characteristics. The content mastering operations can also depend on characteristics of the HDR video, preferences of a content provider (as specified in the metadata (324)), and/or user settings. The content mastering operations can include, for example, exposure correction, applying an energy-preserving bloom operator (to spread high-intensity values, thereby enhancing realism), applying a lens flare operator, performing tone mapping, and/or performing color gamut mapping. Some syntax elements in the metadata (324) can indicate parameters for preferences in content mastering operations, such as a lens flare style or type for a lens flare operator, a lens flare intensity, size, and/or density for the lens flare operator, a strength value, size, and/or density for an energy-preserving bloom operator, a tone mapping operator selected from among multiple available tone mapping operators, and/or a color gamut remapping operator selected from among multiple available color gamut remapping operators. Such parameters can be used to adjust corresponding content mastering operations. Depending on implementation, content mastering operations can be performed in different orders. Examples of content mastering operations are described in sections IV, V, and VI. By performing content mastering operations after distribution of HDR video, a video playback system can use details retained in the HDR video, preferences specified by a content provider, and the properties of the display device that is used for playback (such as the peak brightness of the display device) to improve the perceptual quality of the HDR video as shown on the display device. For example, a video playback system can use an energy-preserving bloom operator to make bright highlights of the HDR video "bloom" into adjacent areas. This accentuates the bright highlights in the HDR video—differences in brightness between highlights can be conveyed to a viewer through different degrees of the blooming effect. Finally, during a display stage (380), the output HDR video (372) is shown on the display device.

In some example implementations, an application from a content provider implements the container processing/decode stage (360) and content mastering stage (370). The application can itself use services provided by a game console or graphics library for decoding operations, exposure correction operations, tone mapping operations, etc. Alternatively, a general-purpose media player or Web browser can implement the container processing/decode stage (360) and content mastering stage (370), potentially calling services provided by a game console or graphics library.

Figure 4:
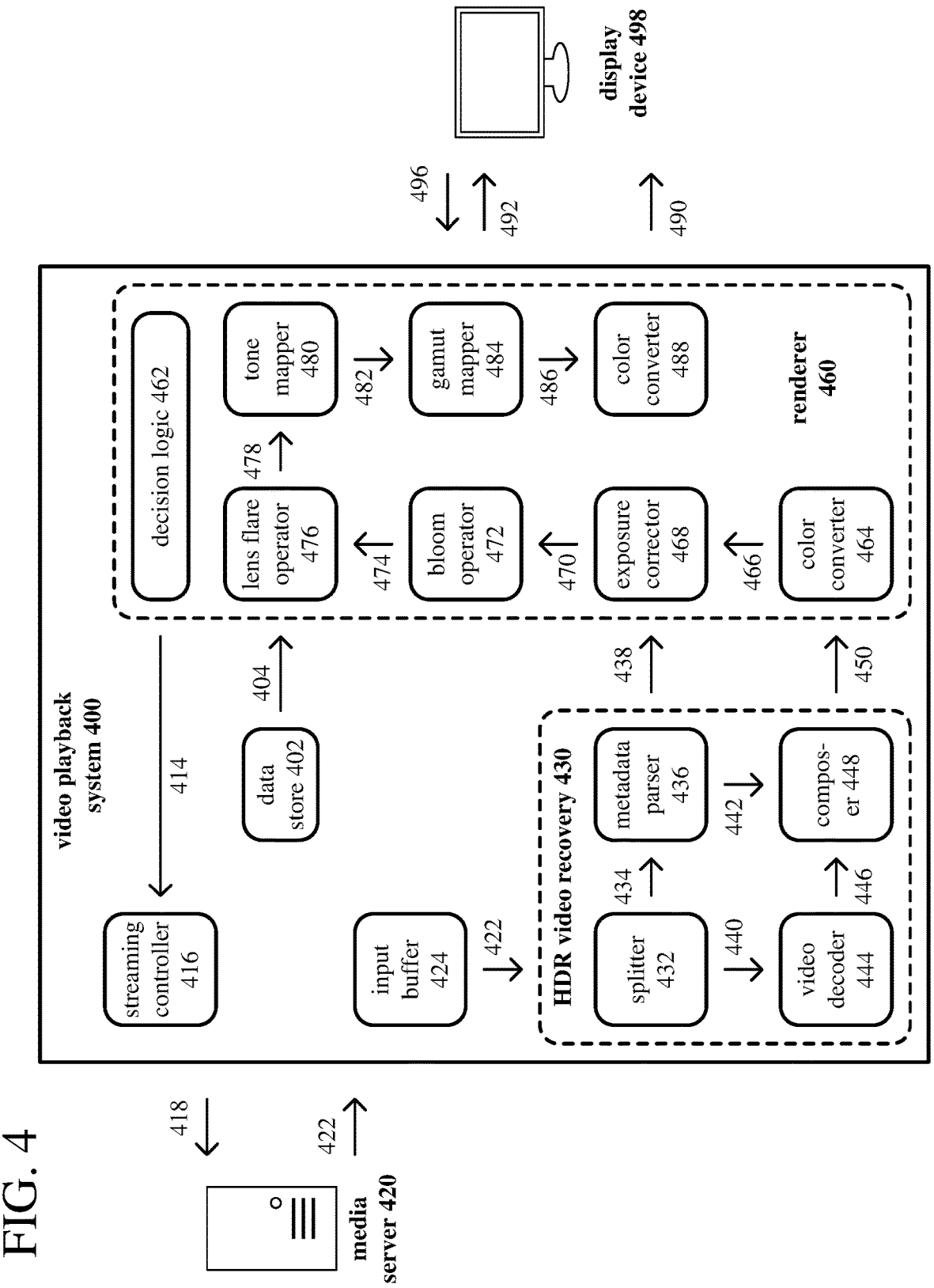
FIG. 4 is a diagram illustrating an example architecture for rendering of HDR video for display on a display device, including a renderer configured to perform various types of content mastering operations.

In the network (350), a media server can store the stream/file (332) with encoded data for the HDR video and metadata (324) for delivery to one or more playback tools. A playback tool includes a video playback system. FIG. 4 shows an example video playback system (400) that can be included in the playback tool. Alternatively, the playback tool uses another video playback system. The encoded video can be provided, for example, for on-demand video streaming, broadcast, or another scenario in which encoded video is sent from one location to one or more other locations. A playback tool can communicate with the media server to determine a stream/file of video for the playback tool to receive. The media server can include server-side controller logic for managing connections with one or more playback tools. A playback tool receives the stream/file, buffers the received encoded data for an appropriate period, and begins decoding and playback.

In another usage scenario, an encoding tool can include a video encoder and other production-side components or modules, which encode video for delivery to one or more playback tools. The unidirectional communication can be provided for live broadcast video streaming, a video surveillance system, web camera monitoring system, remote desktop conferencing presentation or sharing, wireless screen casting, cloud computing or gaming, live gameplay broadcast, or another scenario in which video is encoded and sent from one location to one or more other locations. The encoding tool can include server-side controller logic for managing connections with one or more playback tools. A playback tool can include client-side controller logic for managing connections with the encoding tool. In general, a playback tool communicates with the encoding tool to determine a stream/file of video for the playback tool to receive. The playback tool receives the stream/file, buffers the received encoded data for an appropriate period, and begins decoding and playback. The playback tool can include a video playback system as shown in FIG. 4 or another video playback system.

In still another usage scenario, a real-time communication ("RTC") tool includes both production-side components/modules and playback-side components/modules for bidirectional communication. The bidirectional communication can be part of a video conference, video telephone call, or other two-party or multi-party communication scenario. An RTC tool manages encoding and also manages decoding. For playback, an RTC tool can include a video playback system as shown in FIG. 4 or another video playback system.

IV. Example Architectures for Rendering of HDR Video.

When a video playback system receives HDR video, displaying the HDR video on an HDR display device with a very high peak brightness can provide the highest quality. Many current display devices have a peak brightness (such as 1000 nits or 1500 nits) that is lower than the peak brightness of sample values in an HDR video format, however. This section describes various aspects of example architectures for rendering HDR video for display on a display device, including content mastering operations performed in view of the capabilities of the display device and preferences specified by a content provider (e.g., in metadata).

FIG. 4 shows an example architecture for rendering of HDR video for display on a display device (498). In the example architecture, a video playback system (400) is connected to the display device (498) and media server (420). The video playback system (400) includes a renderer (460) configured to perform various types of content mastering operations. The video playback system (400) also includes a data store (402), streaming controller (416), input buffer (424), and one or more HDR video recovery modules (430).

The display device (498) can be a computer monitor, television screen, mobile device screen, or other type of display device that has a screen area. For its connection to the video playback system (400), the display device (498) can be connected over a local wired connection (e.g., such as an HDMI connector or DisplayPort connector), over a local wireless connection, or over a network connection between distributed computer systems. The display device (498) can be an HDR display device, for example, having a spatial resolution of 1080p, UHD or higher, supporting a wide color gamut, and having a peak brightness of 1000 nits, 1500 nits, 4000 nits, or higher. Or, the display device (498) can be an enhanced dynamic range display device, for example, having a spatial resolution of 720p, 1080p, UHD or higher, supporting a narrow color gamut, and having a peak brightness above 100 nits but below 1000 nits. Or, the display device (498) can be an SDR display device, for example, having a spatial resolution of 720p, 1080p, UHD or higher, supporting a narrow color gamut, and having a peak brightness of 100 nits.

The display device (498) can report various information (496) to the video playback system (400), including capabilities of the display device (498) (e.g., peak brightness, color primary values, reference white point, maximum frame average light level, desired black level, and/or some other characteristic of the display device (498)). The information (496) reported by the display device (498) can also include ambient light level and/or ambient light color in the environment around the display device (498) (e.g., from an ambient light sensor) and/or other information. Some of the information can be reported dynamically (e.g., ambient light level and/or ambient light color) while other information can be reported dynamically or at the time of installation (e.g., peak brightness of the display device (498) and other capability information).

The data store (402) is configured to store settings (404). For example, the settings (404) include information provided by the display device (498), as well as information such as whether the display device (498) is in a power-saving mode and whether brightness of the display device (498) can be controlled programmatically. The data store (402) can send the settings (404) to decision logic (462) of the renderer (460) when requested. Other modules can interact with the data store (402) across an application programming interface ("API"), such as a graphics API of the operating system.

The renderer (460) includes decision logic (462), a first color converter (464), an exposure corrector (468), an energy-preserving bloom operator (472), a lens flare operator (476), a tone mapper (480), a gamut mapper (484), and a second color converter (488). The decision logic (462) is configured to make various decisions about rendering, including the brightness level of the display device (498), how to control the exposure corrector (468), how to apply the energy-preserving bloom operator (472), how to apply the lens flare operator (476), a tone mapping function for the tone mapper (480) to use, and how to use the gamut mapper (484). The decision logic (462) can consider various information when making the decisions, including information (496) from the display device (498), settings (404), as described above, and metadata (438) from the metadata parser (436). Different decisions made by the decision logic (462) are described below with reference to the components or modules controlled by the decisions.

The decision logic (462) sends a decision (414) to the streaming controller (416) about encoded data to request. In the scenario of FIG. 4, the decision logic (462) instructs the streaming controller (416) to request HDR video.

The streaming controller (416) is configured to request encoded data for pictures of HDR video when so instructed by the decision logic (462). Depending on the scenario, the streaming controller (416) can send a request for encoded data to the media server (420) or a media store (not shown). In the scenario shown in FIG. 4, the streaming controller (416) sends a request (418) for HDR video.

The media server (420) can be a Web server or other server, connected over a network, that stores encoded data for video and streams it to client systems for playback. The media server (420) can store encoded data for HDR video as well as encoded data for SDR video. Encoded data for HDR video can be represented in various ways in a media stream or file (422). For example, the media stream/file (422) can include encoded sample values with reduced dynamic range and reduced color gamut, together with metadata indicating parameters that preserve details of properties of input HDR video (e.g., HDR details, color gamut details). Alternatively, the media stream/file (422) can be a video elementary bitstream that includes encoded sample values that retain HDR details, which have been directly encoded. Other metadata included in the media stream/file (422) can indicate preferences in content mastering operations during playback. In the scenario shown in FIG. 4, the media server (420) streams the media stream/file (422) for HDR video to the video playback system (400).

If a media server (420) is not used, the video playback system (400) can retrieve encoded data from a media store (not shown). The media store can be a magnetic disk, optical storage media, non-volatile memory, or other storage or memory, connected locally to the video playback system (400), that stores a media stream/file and sends it to the video playback system (400) for playback. In a media stream/file, the media store can store encoded data for HDR video (together with associated metadata) or encoded data for SDR video.

The input buffer (424) is configured to receive and store the media stream/file (422). In the scenario shown in FIG. 4, the media stream/file (422) includes encoded data for a picture of HDR video in a video sequence. The media stream/file (422) also includes metadata (434), which can be signaled per picture, per scene, per sequence, or on some other basis. In some example implementations, the encoded data for a picture of HDR video is organized according to a video elementary bitstream, which can also include syntax elements for some of the metadata. Syntax elements for the metadata can also be signaled in fields of a container format. Or, syntax elements for the metadata can be signaled in a separate stream or file, with different buffers being configured to receive and store the encoded data and the metadata.

The HDR video recovery module(s) (430) are configured to use the encoded data for the picture of HDR video and at least some of the metadata to reconstruct sample values of the picture of HDR video. In FIG. 4, the HDR video recovery module(s) (430) include a splitter (432), a metadata parser (436), a video decoder (444), and a composer (448). In the architecture shown in FIG. 4, the input buffer (424) sends the media stream/file (422) to the splitter (432). The splitter (432) is configured to receive the media stream/file (422) as input and separate, from the media stream/file (422), encoded data (440) for the HDR video from metadata (434) for the HDR video. The splitter (432) is configured to send the encoded data (440) to the video decoder (444) and send the metadata (434) to the metadata parser (436).

The metadata parser (436) is configured to parse syntax elements of the metadata (434), and thereby retrieve a first set of parameters (442) of the metadata (434) and a second set of parameters (438) of the metadata (434). The first set of parameters (442) indicates properties of the picture of HDR video. For example, the first set of parameters (442) includes parameters that preserve HDR details of the HDR video, details of the wide color gamut of the HDR video, and details of other properties of the HDR video. The metadata parser (436) is configured to send the first set of parameters (442) to the composer (448). The second set of parameters (438) indicates preferences for the content mastering. For example, the second set of parameters (438) includes parameters indicating: a lens flare style or type for a lens flare operator; a lens flare intensity, size, and/or density for the lens flare operator; a strength value, size, and/or density for an energy-preserving bloom operator; a tone mapping operator selected from among multiple available tone mapping operators; and/or a color gamut remapping operator selected from among multiple available color gamut remapping operators. The metadata parser (436) is configured to send the second set of parameters (438) to the renderer (460).

The video decoder is (444) configured to receive and decode the encoded data (440), thereby reconstructing base sample values (446) of video. In FIG. 4, the video decoder (444) decodes the encoded data (440) for a picture of HDR video and reconstructs base sample values (446) of the picture of HDR video. Depending on implementation and the format of the encoded data, the video decoder (444) can decode the encoded data in a manner consistent with the H.265/HEVC standard, ISO/IEC 14496-10 standard (also known as H.264/AVC), another standard, or a proprietary format such as VP9, or a variation or extension thereof. The video decoder (444) is configured to send the reconstructed base sample values (446) to the composer (448).

The composer (448) is configured to, after receiving the base sample values (446) and first set of parameters (442), adjust the base sample values (446) according to the first set parameters (442), and thereby reconstruct the sample values (450) of the picture of HDR video. With HDR details, color gamut details, and/or other details specified in the first set of parameters (442), the composer (448) can reconstruct a version of the HDR video from the base sample values (446). This can produce sample values (450) of the picture of HDR video in an HDR video format used for the input HDR video. The sample values (450) of HDR video are, for example, sample values in HDR-10 format. In this case, the sample values (450) are 10-bit sample values in a YUV-type color space, with a chroma sampling rate of 4:2:0. Alternatively, the sample values output by the composer (448) are in another format, such as a format having 12-bit sample values in an intermediate color space (see below), with a chroma sampling rate of 4:2:0. The first set of parameters (442) can potentially change per picture, per scene (such that all pictures in a scene use the same parameters), or on some other basis.

Alternatively, the HDR video recovery module(s) (430) can include fewer modules. For example, if encoded data (440) and metadata (434) are provided in separate streams/files, the HDR video recovery module(s) (430) need not include a splitter (432). Instead, the encoded data (440) can be provided directly to the video decoder (444) from a buffer, and the metadata (434) can be provided directly to the metadata parser (436) from another buffer. Or, as another example, if HDR details of input HDR video, details of the wide color gamut of HDR input video, and/or other details of the input HDR video are directly represented in the encoded data (440), the HDR video recovery module(s) (430) need not include a splitter (432) or composer (448). Instead, the video decoder (444) can be configured to directly reconstruct the sample values (450) of HDR video from a video elementary bitstream, which may itself include metadata used when reconstructing the sample values (450) of HDR video. The metadata parser (436) can still be configured to receive metadata (434) and extract parameters that indicate preferences for the content mastering, which are passed to the renderer (460). In any case, the HDR video recovery module(s) (430) are configured to produce the set of parameters (438) that indicates preferences for the content mastering and the sample values (450) of HDR video.

The renderer (460) can be part of an application provided by a content provider or other party to perform content mastering operations appropriate for the actual display device that will be used to display HDR video. The application can itself use services provided by a game console or graphics library for exposure correction operations, tone mapping operations, etc. Alternatively, a general-purpose media player or Web browser can implement the renderer (460), potentially calling services provided by a game console or graphics library.

The renderer (460) is configured to perform content mastering on the sample values (450) of the picture of HDR video. With its decision logic (462), the renderer (460) is configured to determine capabilities of the display device (498) based on the information (496) from the display device (498) and/or settings (404) from the data store (402). The capabilities of the display device (498) can include color primary values, peak brightness, reference white point, maximum frame average light level, desired black level, and/or other characteristic of the display device (498). Some syntax elements of the metadata (434) can describe properties of the sample values (450) of a picture of HDR video (e.g., peak brightness, distribution of sample values), which are conveyed to the renderer (460). Alternatively, the decision logic (462) can itself determine properties of the picture of HDR video or get such information from another source (e.g., the video decoder (444)). With its decision logic (462), the renderer (460) is also configured to receive parameters (438) from the metadata parser (436). The set of parameters (438) can indicate preferences (e.g., settings) defined by a content provider for operations of the exposure corrector (468), energy-preserving bloom operator (472), lens flare operator (476), tone mapper (480), and/or gamut mapper (484). Alternatively, settings (404) in the data store (402) can indicate preferences for content mastering operations. With its decision logic (462), the renderer (460) is configured to adjust content mastering (e.g., operations performed by the exposure corrector (468), energy-preserving bloom operator (472), lens flare operator (476), tone mapper (480), and/or gamut mapper (484)) based at least in part on the capabilities of the display device, the properties of the picture of HDR video, and/or the preferences for content mastering operations.

In the renderer (460), the color converter (464) is configured to convert sample values of decoded video from an initial color space to an intermediate color space. In particular, as pre-processing before content mastering operations, the color converter (464) is configured to convert the sample values (450) of the picture of HDR video from an initial color space to an intermediate color space, thereby producing intensity values and color values in the intermediate color space. Before color space conversion or as part of color space conversion, the color converter (464) may perform chroma sample rate upsampling, to restore chroma sample values to have the same resolution as luma sample values in the decoded video.

The initial color space can be a YUV-type color space, and the intermediate color space can be a perceptually uniform, hue linear color space such as IPT. For example, YUV sample values for HDR video, which are output from the video decoder (444), are converted (after or in conjunction with chroma sample rate upsampling) to sample values in an RGB-type color space. The values can be linearized to nits. The sample values in the RGB-type color space are converted to sample values in XYZ color space (as defined in CIE 1931). The sample values in XYZ color space are converted to sample values in the IPT color space. This can involve a transform to LMS values, which are adjusted and transformed to the IPT color space. The IPT color space is an example of a perceptually uniform (or hue linear) color space, in which sample values include intensity (I) values and color values, with one color value (P) representing a value along a red-green dimension, and the other color value (T) representing a value along a yellow-blue dimension. For some content mastering operations (including operations of the exposure corrector (468), energy-preserving bloom operator (472), lens flare operator (476), and tone mapper (480)), the input values can be intensity (I) values in the intermediate color space, potentially after modification through prior content mastering operations. The color (P, T) values in the intermediate color space can be affected by some content mastering operations (e.g., operations of the gamut mapper (484) and, in some implementations, operations of the lens flare operator (476) that add color such as prism highlights) but not others (e.g., operations of the exposure corrector (468), energy-preserving bloom operator (472), or tone mapper (480)). Also, the color (P, T) values in the intermediate color space may be adjusted to compensate for loss of detail (perceptually) introduced by tone mapping, as explained below.

Although shown separately from the composer (448), at least some operations of the color converter (464) can be combined with operations of the composer (448). This might be the case, for example, if the HDR video format for the sample values (450) of the picture of HDR video includes sample values in the intermediate color space.

In FIG. 4, the color converter (464) sends the intensity values (466) in the intermediate color space as input values to the exposure corrector (468), such that the output values from the exposure corrector (468) are modified intensity values in the intermediate color space. With the exposure corrector (468), the renderer (460) is configured to perform exposure correction that selectively adjusts average brightness of the picture of HDR video. In this way, the renderer (460) can control variance in the average brightness between pictures of the video sequence. With its decision logic (462), the renderer (460) can be configured to receive parameters, derived from syntax elements of the metadata (434), that indicate a lag term for the exposure correction and/or a brightness bias for the exposure correction, or receive settings (404) that indicate a lag term and/or brightness bias. The lag term can affect the extent of smoothing that applies at a transition between shots. The brightness bias can be a per-shot adjustment to brightness. Parameters that indicate the lag term and/or brightness bias can be signaled with syntax elements of metadata on a picture-by-picture basis, for a scene, for a sequence, or at some other frequency.

The renderer (460) is also configured to apply an energy-preserving bloom operator (472) to high-intensity values, if any, for the sample values of the picture of HDR video. In FIG. 4, the input values for the energy-preserving bloom operator (472) are the output values (470) from the exposure corrector (468). In alternative configurations, the input values for the energy-preserving bloom operator (472) can be selected sample values (e.g., luma values) from the video decoder (444) or composer (448), intensity values from the color converter (464), or output values from another component/module of the renderer (460).

The energy-preserving bloom operator (472) spreads intensity (energy) from high-intensity values to neighboring values. By spreading the intensity (energy) of the high-intensity values, the overall energy of bright highlights in the HDR video is (at least approximately) preserved when the HDR video is rendered subject to the constraints (e.g., peak brightness) of the display device (498). Without the energy-preserving bloom operator (472), all high-intensity values might simply be clipped at the peak brightness of the display device (498) or compressed to a small range just below the peak brightness of the display device (498), such that variations between bright highlights of different intensity are lost.

To apply the energy-preserving bloom operator (472) to the high-intensity values, the renderer (460) is configured to identify the high-intensity values from among input values for the sample values (450) of the picture of HDR video. For example, the renderer (460) can compare input values to a bloom threshold that is based on the peak brightness of the display device (498). Any input value above the bloom threshold is designated to be one of the high-intensity values. Or, the renderer (460) can subtract the bloom threshold from the respective input values. If the resulting value is positive for an input value, that input value is designated to be one of the high-intensity values. With its decision logic (462), the renderer (460) can be configured to receive one or more parameters, derived from syntax elements of the metadata (434), that indicate a multiplier for the bloom threshold, or receive a setting (404) that indicates a bloom threshold. For example, the multiplier is a value such as 1.1, 1.5 or 2.0. By setting the bloom threshold to be the multiplier times the peak brightness of the display device (498), the renderer (460) avoids applying the bloom operator to high-intensity values that are only slightly above the peak brightness of the display device (498). Parameter(s) that indicate the multiplier for the bloom threshold can be signaled with syntax elements of metadata on a picture-by-picture basis, for a scene, for a sequence, or at some other frequency. Section VI further describes examples of operations that can be performed to identify high-intensity values.

The renderer (460) can represent the identified high-intensity values in an intermediate picture for subsequent processing. The intermediate picture initially includes only zero values. The renderer (460) adds overflow values for the respective high-intensity values at locations corresponding to the locations in the picture of HDR video at which the high-intensity values were identified. For an identified high-intensity value, an overflow value indicates an excess or surplus energy above the bloom threshold.

To apply the energy-preserving bloom operator (472) to the high-intensity values, the renderer (460) is further configured to use the energy-preserving bloom operator to produce adjustment values. This blurs the high-intensity values to create a blooming effect. For example, the bloom operator is applied to overflow values for the identified high-intensity values in the intermediate picture. With its decision logic (462), the renderer (460) can be configured to receive one or more parameters, derived from syntax elements of the metadata (434), that indicate a strength value (or size value, density value, or other characteristic) for the bloom operator, or receive a setting (404) that indicates a strength/size/density value for the bloom operator. The value can control the extent (spatially) to which the energy of high-intensity values is spread to adjacent areas. Parameters that indicate the strength/size/density value for the bloom operator can be signaled with syntax elements of metadata on a picture-by-picture basis, for a scene, for a sequence, or at some other frequency. Section VI further describes various examples of bloom operator.

Finally, to apply the energy-preserving bloom operator (472) to the high-intensity values, the renderer (460) is configured to merge the adjustment values (e.g., blurred overflow values) into the picture of HDR video. For example, the input values are selectively increased by adding the adjustment values from the corresponding locations in the intermediate picture. Alternatively, the adjustment values can be merged into values for the sample values (450) of the picture of HDR video at a later stage (e.g., after tone mapping).

The renderer (460) is further configured to apply a lens flare operator (476) to high-intensity values, if any, for the sample values (450) of the picture of HDR video. In FIG. 4, the input values for the lens flare operator (476) are the output values (474) from the energy-preserving bloom operator (472). In alternative configurations, the lens flare operator (476) and energy-preserving bloom operator (472) can be applied concurrently. Or, the input values for the lens flare operator (476) can be selected sample values (e.g., luma values) from the video decoder (444) or composer (448), intensity values from the color converter (464), or output values from some other component/module of the renderer (460). The lens flare operator (476) can apply a lens flare pattern for a halo effect, streaking effect, or other effect. With its decision logic (462), the renderer (460) can be configured to receive parameters, derived from syntax elements of the metadata (434), that indicate a lens flare style/type and/or lens flare intensity (or size or density) for the lens flare operator, or receive settings (404) that indicate a lens flare style/type and/or lens flare intensity/size/density for the lens flare operator. The lens flare style/type can indicate a selection from a list of lens flare patterns (e.g., halo effect, horizontal streaks, vertical streaks, or both horizontal streaks and vertical streaks; including 4, 6, 8, 10, or some other number of streaks, as per common cameras). The lens flare intensity/size/density is a factor that controls how much lens flare is added. Parameters that indicate the lens flare style/type and/or lens flare intensity/size/density can be signaled with syntax elements of metadata on a picture-by-picture basis, for a scene, for a sequence, or at some other frequency.

The decision logic (462) is also configured to set a tone mapping function to be used by the tone mapper (480). The decision logic (462) can be configured to set the tone mapping function based at least in part on the properties of the sample values (450) of the picture of HDR video (e.g., distribution of the sample values (450) of the picture of HDR video). The decision logic (462) can consider various other information when setting the tone mapping function, for example, peak brightness of the display device (498) and/or an indication of ambient light in an environment around the display device (498). The decision logic (462) is configured to send the tone mapping function to the tone mapper (480). With its decision logic (462), the renderer (460) can be configured to receive parameters, derived from syntax elements of the metadata (434), that indicate a tone mapping operator selected from among multiple available tone mapping operators, or receive a setting (404) that indicates such a tone mapping operator. Parameters that indicate the tone map operator can be signaled with syntax elements of metadata on a picture-by-picture basis, for a scene, for a sequence, or at some other frequency.

With the tone mapper (480), the renderer (460) is configured to perform tone mapping operations, according to the tone mapping function for the indicated tone mapping operator, on input values for the sample values (450) of the picture of HDR video. In FIG. 4, the input values for the tone mapper (480) are the output values (478) from the lens flare operator (476). In alternative configurations, the input values for the tone mapper (480) can be selected sample values (e.g., luma values) from the video decoder (444) or composer (448), intensity values from the color converter (464), or output values from some other component/module of the renderer (460). When the input values to the tone mapper (480) are intensity values for HDR video in an intermediate color space, the output values from the tone mapper are tone-mapped intensity values in the intermediate color space.

The tone mapper (480) can be configured to apply tone mapping on a region-by-region basis within a picture. For example, the tone mapper (480) uses a tone mapping function that varies from region-to-region within a picture, depending on the content of the picture, or even skips tone mapping for some regions of the picture. Or, the tone mapper (480) can be configured to apply tone mapping throughout a picture.

The tone mapper (480) can also be configured to adjust at least some of the color values (in the intermediate color space). Although I, P and T values are decorrelated, boosting of intensity values during tone mapping may cause "whitening" (desaturation). The perceived desaturation can make colors appear less vivid and make small differences between certain colors (e.g., light bluish colors) more difficult to perceive. To compensate for this, P and T values may be selectively adjusted, depending on hue. This increases selected P and T values in order to make colors more vivid (saturated). Other color values can be passed through without adjustment.

With the gamut mapper (484), the renderer (460) is configured to map the sample values (450) of the picture of HDR video from a first color gamut to a second color gamut according to an indicated color gamut remapping operator. The first color gamut is based on color primary values associated with content encoding and decoding. The second color gamut is based on color primary values associated with the display device (498). In FIG. 4, the input values for the gamut mapper (484) are the output values (482) from the tone mapper (480). In alternative configurations, the input values for the gamut mapper (484) can be sample values from the video decoder (444) or composer (448), output values from the color converter (464), or output values from some other component/module of the renderer (460). With its decision logic (462), the renderer (460) can be configured to receive parameters, derived from syntax elements of the metadata (434), that indicate a color gamut remapping operator selected from among multiple available color gamut remapping operators, or receive a setting (404) that indicates such a color gamut remapping operator. Parameters that indicate the color gamut remapping operator can be signaled with syntax elements of metadata on a picture-by-picture basis, for a scene, for a sequence, or at some other frequency. Thus, for example, the gamut mapper can use a mapping approach specified by a content provider or user setting (e.g., tetrahedral or tri-linear interpolation).

With the color converter (488), the renderer (460) is configured to convert the modified intensity values (486) and color values (possible adjusted) in the intermediate color space, from the intermediate color space to a final color space for the sample values (490). For example, the final color space is an RGB-type color space specific to the display device (498).

The decision logic (462) can also be configured to determine a brightness level of the display device (498). In determining the brightness level of the display device (498), the decision logic (462) can consider the peak brightness of the display device (498), properties of the HDR video, ambient light level of the viewing environment, and/or other information. The decision logic (462) can be further configured to send, to the display device (498), a control signal (492) that indicates the brightness level of the display device (498).

The decision logic (462) can consider various other factors when making decisions about rendering. For example, the decision logic (462) can be configured to determine a proportion of the screen area of the display device (498) that is to be used for video rendering (e.g., full screen or some tile less than full screen). An indication of the proportion of the screen area that is to be used for video rendering can be reported as one of the settings (404) from the data store (402). As another example, the decision logic (462) can be configured to determine whether the brightness level of the display device (498) can be programmatically controlled using a control signal (492). An indication of whether the brightness level of the display device (498) can be programmatically controlled can be reported as one of the settings (404) from the data store (402). As another example, the decision logic (462) can be configured to determine whether the display device (498) is in a power-saving mode. An indication of whether the display device (498) is in a power-saving mode can be reported as one of the settings (404) from the data store (402).

Depending on implementation and the type of processing desired, modules of the video playback system (400) can be added, omitted, split into multiple modules, combined with other modules, and/or replaced with like modules. For example, the decision logic (462) can be split into multiple components/modules associated with different decisions, which may be combined with components/modules affected by those decisions. In alternative embodiments, video playback systems with different modules and/or other configurations of modules perform one or more of the described techniques. Specific embodiments of video playback systems typically use a variation or supplemented version of the video playback system (400). The relationships shown between modules within the video playback system (400) indicate general flows of information in the video playback system (400); other relationships are not shown for the sake of simplicity. In general, a given module of the video playback system (400) can be implemented by software executable on a CPU, by software controlling special-purpose hardware (e.g., a GPU or other graphics hardware for video acceleration), or by special-purpose hardware (e.g., in an ASIC). In particular, in some example implementations, tone mapping operations are performed using a general-purpose GPU (e.g., with shader instructions), and the decision logic (462) is implemented in software executable on a CPU.

V. Example Approaches to Performing Content Mastering Operations During Playback of HDR Video.

Figure 5:
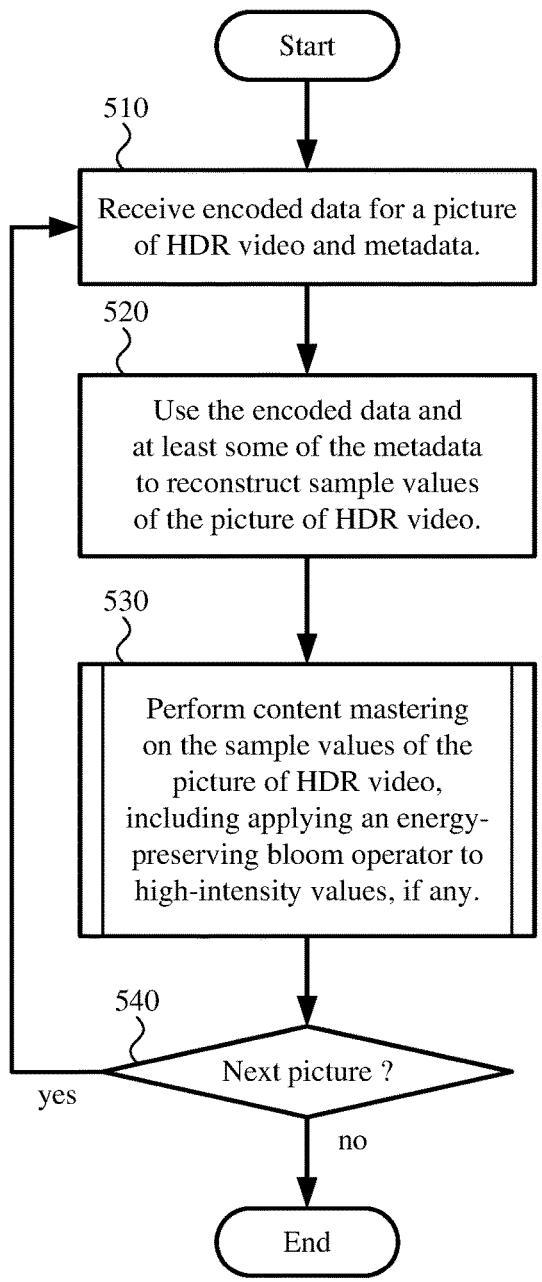
FIG. 5 is a diagram illustrating a generalized technique for performing content mastering operations during playback of HDR video, including application of an energy-preserving bloom operator.

FIG. 5 shows a generalized technique (500) for performing content mastering operations during playback of HDR video, including application of an energy-preserving bloom operator. A video playback system such as the video playback system (400) shown in FIG. 4 or other video playback system can perform the technique (500).

The video playback system receives (510) encoded data for a picture of HDR video along with metadata. The video playback system uses (520) the encoded data and at least some of the metadata to reconstruct sample values of the picture of HDR video. The sample values of the picture of HDR video are in an HDR video format. The HDR video format can be an HDR video format as described in section II or other HDR video format. When content mastering operations have been skipped before encoding (or scalable content mastering operations were performed before encoding), after the sample values of the picture of HDR video have been reconstructed, the sample values of the picture of HDR video can have a full range of brightness for the HDR video format (e.g., up to 10K nits or higher).

Then, the video playback system performs (530) content mastering on the sample values of the picture of HDR video. In particular, as part of the content mastering, the video playback system applies an energy-preserving bloom operator to high-intensity values, if any, for the sample values of the picture of HDR video. Examples of application of an energy-preserving bloom operator are described in the next section. Additional examples of content mastering operations are described below with reference to FIG. 6.

By performing content mastering operations after decoding, the video playback system can adjust content mastering operations to the capabilities of the display device, to preferences indicated in metadata by a content provider, and/or to user settings. For example, the video playback system can determine capabilities of the actual display device. The capabilities of the actual display device can include color primary values (e.g., RGB primary values), peak brightness, reference white point, maximum frame average light level, desired black level, and/or another characteristic of the actual display device. Whereas conventional content mastering operations might consider such capabilities for a reference display device before encoding, the content mastering operations described herein can instead consider such capabilities for the actual display device used during playback. The video playback system can also receive metadata that describes properties of the picture of HDR video and, from the metadata (or otherwise), determine the properties of the picture of HDR video. The video playback system can also receive metadata that describes preferences of a content provider for content mastering operations and, from the metadata (or otherwise), determine the preferences. The video playback system can also determine user settings (e.g., desired average brightness) and other information (e.g., ambient light level for the viewing environment). Based on the capabilities of the display device, properties of the picture of HDR video, preferences for content mastering operations, user settings, and/or other information, the video playback system can adjust content mastering.

According to the generalized technique (500) shown in FIG. 5, the video playback system checks (540) whether to continue with the next picture in the video sequence. If so, the video playback system receives (510) encoded data for the next picture of HDR video in the video sequence as well as metadata, uses (520) the encoded data and at least some of the metadata to reconstruct sample values of the next picture, and performs (530) content mastering on the sample values of the next picture. In this way, the video playback system can successively decode and render pictures of the video sequence.

In practice, the order in which pictures of HDR video in a video sequence are decoded (called the decoding order, bitstream order, or coded order) can differ from the order in which the pictures of HDR video are displayed (called the display order or output order). Also, depending on implementation, decoding operations may be performed asynchronously from content mastering operations. For example, multiple pictures may be decoded by a video decoding module and buffered for output. Separately, as needed before display, content mastering operations may be performed on sample values of the respective pictures. Further, in some cases, certain content mastering operations for a picture might be performed concurrently with decoding operations for the picture. For example, content mastering operations may be performed for one (previously decoded) portion of a picture while decoding operations are performed for another portion of the picture. For any of these reasons, or another reason, the timing of decoding and content mastering operations need not be controlled by a checking (540) operation as shown in FIG. 5.

Figure 6:
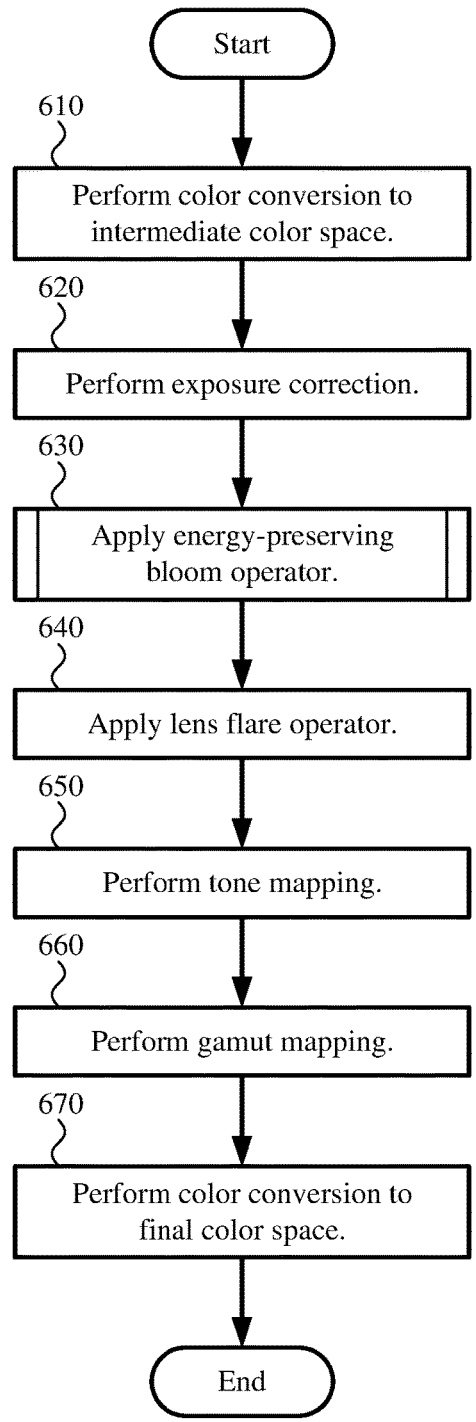
FIG. 6 is a flowchart illustrating an example technique for performing various types of content mastering operations during playback of HDR video.

FIG. 6 shows an example technique (600) for performing various types of content mastering operations during playback of HDR video. The example technique (600) illustrates one possible way to perform operations for content mastering (530) in the technique (500) shown in FIG. 5. Alternatively, the operations described with reference to FIG. 6 can be performed in some other order, or the content mastering (530) can include other and/or additional operations.

With reference to FIG. 6, the video playback system performs (610) color conversion operations. The video playback system converts sample values of a picture of HDR video from an initial color space into an intermediate color space, thereby producing intensity values and color values in the intermediate color space. For example, the initial color space is a YUV-type color space used during video encoding and decoding, and the intermediate color space is IPT. Some content mastering operations (such as applying an energy-preserving bloom operator and tone mapping) can be performed on intensity values in the intermediate color space.

The video playback system then performs (620) exposure correction on the picture of HDR video. The exposure correction selectively adjusts average brightness of the picture of HDR video, thereby controlling variance in the average brightness between pictures of the video sequence. For example, if the current picture of HDR video is brighter than the previous picture(s) in the video sequence, the video playback system can lower the average brightness of the current picture to match the brightness of the previous picture(s). Conversely, if the current picture of HDR video is darker than the previous picture(s) in the video sequence, the video playback system can increase the average brightness of the current picture to match the brightness of the previous picture(s). The video playback system can receive metadata including one or more syntax elements that indicate a lag term for the exposure correction and/or a brightness bias for the exposure correction. Such metadata can be signaled per picture, per scene, per sequence, or on some other basis. Alternatively, user settings for the video playback system or display device can indicate a lag term and/or brightness bias. In any case, the video playback system can use the lag term and/or brightness bias to control the exposure correction.

The video playback system applies (630) an energy-preserving bloom operator to high-intensity values, if any, among input values for the sample values of the picture of HDR video. In the example of FIG. 6, the input values are selected values (e.g., intensity values) that result from the exposure correction (620) after color space conversion (610). For example, the video playback system applies an energy-preserving bloom operator as described in section VI. The video playback system can receive metadata including one or more syntax elements that indicate a bloom threshold and/or bloom intensity. In general, the bloom threshold is a brightness value above which bloom occurs, and can be expressed as a multiplier over a reference white point. In general, the bloom intensity is a factor (such as a strength value, size, and/or density for a bloom operator) that controls how much bloom is added to the picture of HDR video. Such metadata can be signaled per picture, per scene, per sequence, or on some other basis. Alternatively, user settings for the video playback system or display device can indicate a bloom threshold and/or bloom intensity. In any case, the video playback system can use the bloom threshold and/or bloom intensity to control how the energy-preserving bloom operator is applied.

The video playback system also applies (640) a lens flare operator to high-intensity input values for the sample values of the picture of HDR video. In the example of FIG. 6, the high-intensity input values are selected values (e.g., intensity values) that result from the exposure correction (620) after color space conversion (610), potentially after or concurrently with modification by the energy-preserving bloom operator. The video playback system can receive metadata including one or more syntax elements that indicate (1) a lens flare style or type and/or (2) a lens flare intensity, size, and/or density for the lens flare operator. The lens flare style/type can indicate a selection from a list of lens flare patterns (e.g., halo effect, horizontal streaks, vertical streaks, or both horizontal streaks and vertical streaks; including 4, 6, 8, 10, or some other number of streaks). The lens flare intensity/size/density is a factor that controls how much lens flare is added. Such metadata can be signaled per picture, per scene, per sequence, or on some other basis. Alternatively, user settings for the video playback system or display device can indicate a lens flare style/type and/or lens flare intensity/size/density. In any case, the video playback system can use the lens flare style/type and/or lens flare intensity/size/density to control how the lens flare operator is applied. In this way, the video playback system can simulate various reactions of the human visual system when very bright highlights are viewed, which enhances the realism of playback of the HDR video. The lens flare operator can also add color (e.g., prism highlights) as indicated by syntax elements in metadata or user settings.

The video playback system also performs (650) tone mapping, according to a tone mapping function for an indicated tone mapping operator, on input values for the sample values of the picture of HDR video. In the example of FIG. 6, the input values are intensity values that result from the exposure correction (620) after color space conversion (610), potentially after modification by the energy-preserving bloom operator and/or lens flare operator. The tone mapping function can depend on peak brightness of the display device, distribution of the sample values of the picture of HDR video, ambient light characteristics in the viewing environment, and/or other factors. The video playback system can receive metadata including one or more syntax elements that indicate a tone mapping operator selected from among multiple available tone mapping operators. Such metadata can be signaled per picture, per scene, per sequence, or on some other basis. Alternatively, user settings for the video playback system or display device can indicate a tone mapping operator selected from among multiple available tone mapping operators.

The video playback system performs (660) color gamut mapping, which maps sample values of the picture of HDR video from a first color gamut to a second color gamut according to an indicated color gamut remapping operator. The first color gamut is used during encoding and decoding. The second color gamut is based on color primary values associated with the display device. In the example of FIG. 6, the gamut mapping operates on intensity values and color values in the intermediate color space. The video playback system can receive metadata including one or more syntax elements that indicate a color gamut remapping operator selected from among multiple available color gamut remapping operators. Such metadata can be signaled per picture, per scene, per sequence, or on some other basis. Alternatively, user settings for the video playback system or display device can indicate a color gamut remapping operator selected from among multiple available color gamut remapping operators.

Finally, the video playback system performs (670) color conversion operations again. At this stage, the video playback system converts intensity values and color values from the intermediate color space into sample values in a final color space, which is the color space for the display device.

The ordering of content mastering operations can be varied in different implementations. For example, the video playback system can apply the lens flare operator before applying the energy-preserving bloom operator, or the two operators can be applied concurrently. As another example, the video playback system can perform tone mapping and/or gamut mapping before applying the lens flare operator and/or energy-preserving bloom operator. Also, content mastering operations (such as tone mapping, application of an energy-preserving bloom operator and/or lens flare operator) can be performed on sample values in the color space used for encoding and decoding (that is, an initial color space such as a YUV-type color space). In this case, the input values for content mastering operations (such as tone mapping, application of an energy-preserving bloom operator and/or lens flare operator) can be the luma (Y) sample values for a picture of HDR video.

VI. Examples of Energy-Preserving Bloom Operators for Playback of HDR Video.

In some approaches to content mastering, tone mapping operations do not preserve the energy of intensity values that are higher than the peak brightness of a display device. Such high-intensity values may be clipped or compressed to a small range just below the peak brightness of the display device, such that variations between bright highlights of different intensity are lost. In contrast, in real life, a camera or human visual system often spreads the energy of high-intensity values of a bright highlight to produce an effect such as streaking, a halo, or blooming around the bright highlight.

This section describes examples of an energy-preserving bloom operator used during playback of HDR video. The energy-preserving bloom operator can accurately simulate the reactions of a camera or the human visual system when intensity values higher than the peak brightness of a display device are viewed, for enhanced realism when light sources and specular highlights (reflections) in the HDR video are rendered. For example, the energy-preserving bloom operator allows a video playback system to indicate to a viewer that one highlight is brighter than another highlight, even if both highlights are too bright for the display device.

Figure 8:
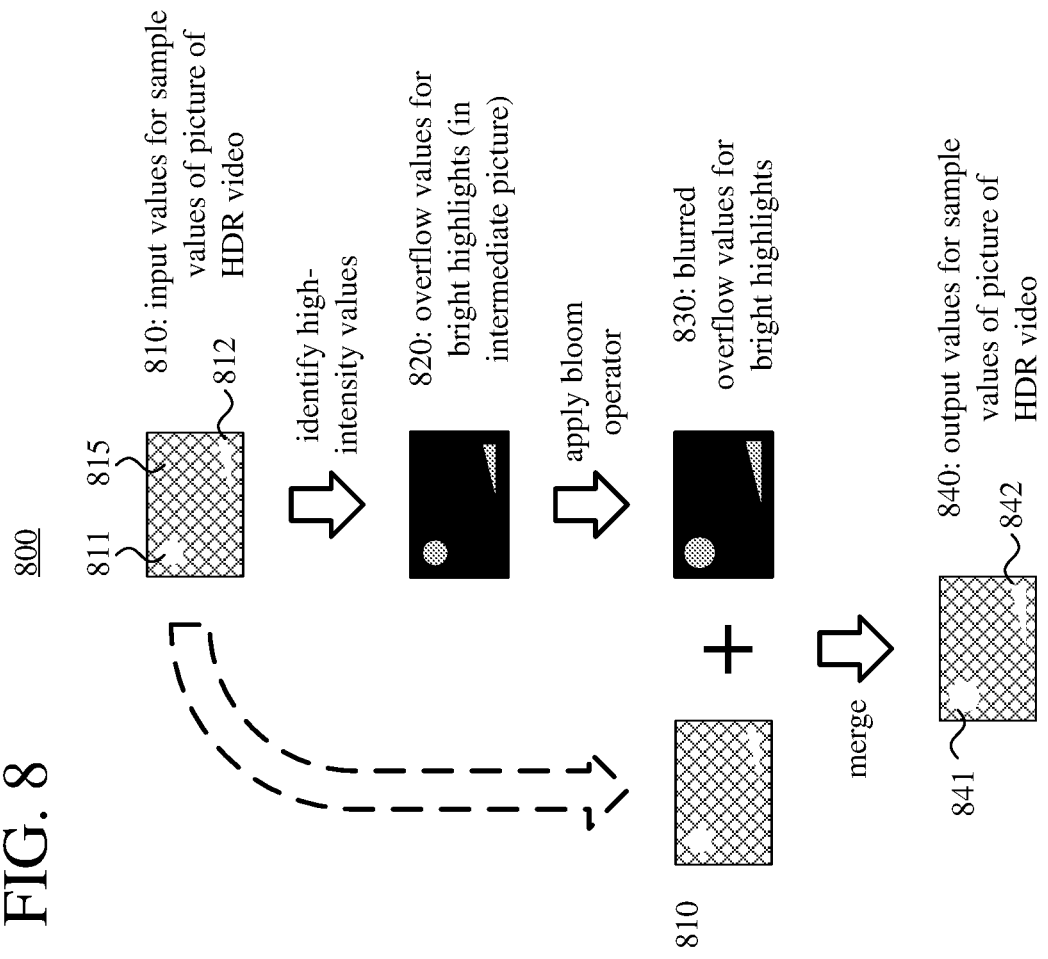
FIG. 8 is a diagram illustrating an example of application of an energy-preserving bloom operator to high-intensity values for sample values of a picture of HDR video.
Figure 7:
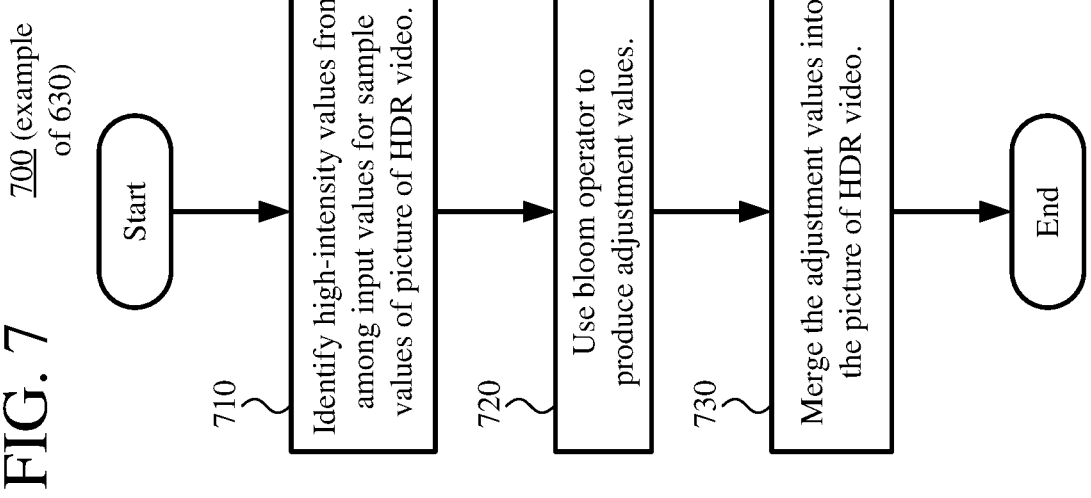
FIG. 7 is a flowchart illustrating an example technique for applying an energy-preserving bloom operator to high-intensity values for sample values of a picture of HDR video.

FIG. 7 shows an example technique (700) for applying an energy-preserving bloom operator to high-intensity values for sample values of a picture of HDR video. The example technique (700) illustrates one possible way to apply an energy-preserving bloom operator (630) in the technique (600) shown in FIG. 6. FIG. 8 shows a simplified example of application of an energy-preserving bloom operator to high-intensity values for sample values of a picture of HDR video.

With reference to FIG. 8, the video playback system receives input values (810) for sample values of a picture of HDR video. The input values can be intensity values after exposure correction. Alternatively, the input values can be output values from some other component/module of a renderer such as the renderer (460) described with reference to FIG. 4. Or, the input values can be luma sample values. In FIG. 8, the input values include two bright highlights (811, 812). The circular bright highlight (811) represents a light source. The triangular bright highlight (812) represents a reflection. For the other input values (815), details are abstracted away.

With reference to FIG. 7, the video playback system identifies (710) high-intensity values from among input values for the sample values of the picture of HDR video. In some example implementations, for each of the input values, the video playback system compares the input value to a bloom threshold. If the input value satisfies the bloom threshold (e.g., is greater than the bloom threshold, or is at least as large as the bloom threshold, depending on implementation), the video playback system designates the input value to be one of the high-intensity values. Alternatively, the video playback system can subtract the bloom threshold from the respective input values. If the resulting value is positive for an input value, that input value is designated to be one of the high-intensity values.

The bloom threshold can depend on the peak brightness of the display device and/or a multiplier. For example, the video playback system identifies the peak brightness of the display device and sets the bloom threshold based at least in part on the peak brightness of the display device. The video playback system can determine the multiplier for the bloom threshold from syntax element(s) in metadata received by the video playback system or from a setting (e.g., user setting or display device setting). The video playback system can set the bloom threshold to be the multiplier times the peak brightness of the display device.

With reference to FIG. 8, an intermediate picture buffers overflow values (820) for bright highlights, for the high-intensity values identified in the picture of HDR video. In the example of FIG. 8, this includes overflow values for high-intensity values in the circular bright highlight (811) and overflow values for high-intensity values in the triangular bright highlight (812). The overflow values represent excess or surplus energy in the identified high-intensity values compared to the bloom threshold. As such, the overflow values are shown as gray in FIG. 8. In FIG. 8, the overflow values are shown in a uniform color for the sake of simplicity. In practice, the overflow values will typically vary within a bright highlight. The intermediate picture includes the overflow values for identified high-intensity values at locations that correspond to locations of the identified high-intensity values in the picture of HDR video. At other locations, the intermediate picture includes zero values, which are shown as black in the intermediate picture of FIG. 8.

For example, to identify bright highlights among input values for a picture of HDR video, the video playback system checks whether a given input value v is greater than a bloom threshold bt. If v>bt, the given input value v is designated to be a high-intensity value. The bloom threshold bt can be set as described above.

Alternatively, the input values are normalized to a range of 0.0 to 1.0, where 1.0 is the peak brightness of the display device. The peak brightness can be, for example, 1000 nits, 1500 nits, or 2000 nits. The bloom threshold is a multiplier indicated by metadata or a setting (e.g., user setting or display device setting). For example, the multiplier is 1.1, 1.5 or 2.0. To generate the intermediate picture, the video playback system can subtract the bloom threshold (e.g., 2.0) from each of the input values. If the result is positive (that is, the input value is greater than the bloom threshold), the input value is designated to be a high-intensity value, and the overflow value (e.g., difference between the input value and bloom threshold) is retained at the appropriate location in the intermediate picture. (If the result is between −1.0 and 0.0, the input value is higher than the peak brightness of the display device but less than the brightness threshold. Such an input value is bright, but not bright enough to contribute to the blooming effect of the energy-preserving bloom operator. Alternatively, the multiplier can be 1.0 (or there is no multiplier), and any input value brighter than the peak brightness of the display device potentially contributes to the blooming effect of the energy-preserving bloom operator.)

With reference to FIG. 7, the video playback system uses (720) the bloom operator to produce adjustment values. In general, when it uses the bloom operator to produce adjustment values, the video playback system blurs the identified high-intensity values (e.g., blurring overflow values in the intermediate picture). For example, the video playback system applies a filter to overflow values (for the identified high-intensity values) in an intermediate picture, thereby changing at least some values adjacent the overflow values in the intermediate picture to be non-zero. The video playback system can determine the strength, size, density, etc. of the bloom operator (e.g., filter) from syntax element(s) in metadata received by the video playback system or from a setting (e.g., user setting or display device setting). The design of the filter depends on implementation.

The filter can have a fixed-size kernel, or the kernel size can vary depending on syntax element(s) in metadata received by the video playback system or a setting (e.g., user setting or display device setting). The filter can be a one-dimensional filter applied in two separable passes (horizontal then vertical, or vice versa). Or, the filter can be a two-dimensional filter.

The filter can be a Gaussian smoothing filter. Applying a Gaussian smoothing filter causes an overflow value to spread by an amount that depends on the magnitude of the overflow value filtered, its neighbors, and the strength of the Gaussian smoothing filter. For example, a cluster of relatively large overflow value may spread to a larger area of adjacent values, while a cluster of relatively small overflow value spreads to a smaller area of adjacent values. Alternatively, another type of filter can be used. Alternatively, the bloom operator can use some other operator (such as a dilation operator) to expand around overflow values in the intermediate picture by up to x locations, where x depends on implementation (e.g., 2, 3).

With reference to FIG. 8, after the bloom operator is applied, the intermediate picture buffers blurred overflow values (830) for the bright highlights. For each of the bright highlights, the area that includes overflow values has expanded, compared to the intermediate picture before application of the bloom operator. The blurred overflow values provide adjustment values to merge back into the picture of HDR video. In FIG. 8, the blurred overflow values are shown in a uniform color for the sake of simplicity. In practice, the blurred overflow values may be darker towards the edge of a bright highlight.

With reference to FIG. 7, the video playback system merges (730) the adjustment values into the picture of HDR video. In this way, the video playback system adds "excess" energy from the high-intensity values, after spreading, blurring, etc. according to the blooming effect, back to values for the sample values of the picture of HDR video. The adjustment values can be added back to input values at various stages (e.g., before tone mapping or after tone mapping, before application of a lens flare operator or after application of a lens flare operator). In any case, adding a "bloom term" made of the adjustment values helps preserve energy of the high-intensity values in the picture of HDR video, for improved realism when the HDR video is shown on a display device.

With reference to FIG. 8, merging the adjustment values into the picture of HDR video yields output values (840) for the sample values of the picture of HDR video. After application of the energy-preserving bloom operator, the extent of the blooming effect in the output values (840) can depend on the magnitude of the high-intensity values and overflow values that were blurred (as explained above) as well as the peak brightness of the display device. If a display device has a high peak brightness, the blooming effect might not be as significant since fewer values are designated as high-intensity values. If a display device has a low peak brightness, the blooming effect may be more significant since more values are designated as high-intensity values.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. I therefore claim as my invention all that comes within the scope and spirit of these claims.

I claim:

1. A computer system comprising one or more processing units, memory, and a display device, wherein the computer system implements a video playback system comprising:
    a set of one or more buffers configured to receive encoded data for a picture of high dynamic range ("HDR") video and to receive metadata; and
    a renderer configured to perform content mastering on sample values of the picture of HDR video after reconstruction of the sample values of the picture of HDR video using the encoded data and at least some of the metadata, wherein the renderer is configured to:
        identify high-intensity values from among input values for the sample values of the picture of HDR video, each of the high-intensity values satisfying a threshold; and
        apply an energy-preserving operator to blur the identified high-intensity values, wherein the energy-preserving operator spreads energy of the identified high-intensity values to neighboring values, and wherein, to apply the energy-preserving operator, the renderer is configured to perform operations including:
            extracting an overflow value indicating excess energy above the threshold for a given one of the identified high-intensity values;
            spreading the excess energy over an area adjacent to the given identified high-intensity value to obtain adjustment values; and
            merging the adjustment values into the picture of HDR video.

2. The computer system of claim 1, wherein, for the content mastering, the renderer is further configured to perform exposure correction that selectively adjusts average brightness of the picture of HDR video, and thereby control variance in the average brightness between pictures of a video sequence.

3. The computer system of claim 2, wherein the metadata includes a syntax element that indicates:
    a brightness bias for the exposure correction, the brightness bias indicating a per-shot adjustment to brightness.

4. The computer system of claim 1, wherein the identified high-intensity values comprise all of the input values that exceed a peak brightness of the display device.

5. The computer system of claim 1, wherein the renderer is further configured to:
    identify a peak brightness of the display device; and
    set the threshold based at least in part on the peak brightness of the display device.

6. The computer system of claim 1, wherein an intermediate picture includes overflow values for the identified high-intensity values at locations that correspond to locations of the identified high-intensity values in the picture of HDR video, the overflow values for the identified high-intensity values including the overflow value for the given one of the identified high-intensity values.

7. The computer system of claim 1, wherein an intermediate picture includes overflow values for the identified high-intensity values at locations that correspond to locations of the identified high-intensity values in the picture of HDR video, the overflow values for the identified high-intensity values including the overflow value for the given one of the identified high-intensity values, and wherein, to obtain the adjustment values, the renderer is configured to:
    apply a filter to the overflow values in the intermediate picture, and thereby change at least some values adjacent the overflow values in the intermediate picture to be non-zero, wherein the filtered overflow values and changed adjacent values determine the adjustment values.

8. The computer system of claim 7, wherein the filter is a Gaussian smoothing filter.

9. The computer system of claim 1, wherein the metadata includes syntax elements that indicate:
    a multiplier for the threshold used to identify the high-intensity values; and/or
    a strength value for the energy-preserving operator, a size for the energy-preserving operator, and/or a density for the energy-preserving operator.

10. The computer system of claim 1, wherein the metadata includes one or more syntax elements that indicate a color gamut remapping operator selected from among multiple available color gamut remapping operators, and wherein, for the content mastering, the renderer is further configured to map the sample values of the picture of HDR video from a first color gamut to a second color gamut according to the indicated color gamut remapping operator, the second color gamut being based on color primary values associated with the display device.

11. The computer system of claim 1, wherein the renderer is further configured to convert the sample values of the picture of HDR video from an initial color space to an intermediate color space, and thereby produce intensity values and color values in the intermediate color space.

12. The computer system of claim 1, wherein, for the content mastering, the renderer is further configured to apply a lens flare operator to at least some of the input values for the sample values of the picture of HDR video.

13. The computer system of claim 12, wherein the metadata includes syntax elements that indicate:
    a lens flare style or type for the lens flare operator; and/or
    a lens flare intensity, size, and/or density for the lens flare operator.

14. The computer system of claim 1, wherein the metadata includes one or more syntax elements that indicate a tone mapping operator selected from among multiple available tone mapping operators, and wherein, for the content mastering, the renderer is further configured to perform tone mapping operations, according to a tone mapping function for the indicated tone mapping operator, on at least some of the input values for the sample values of the picture of HDR video.

15. The computer system of claim 1, wherein the video playback system further comprises one or more HDR video recovery modules configured to use the encoded data and the at least some of the metadata to reconstruct the sample values of the picture of HDR video, wherein the one or more HDR video recovery modules include:
a splitter configured to separate, from a media stream or file, the encoded data from the metadata;
a metadata parser configured to parse syntax elements of the metadata, and thereby retrieve a first set of parameters and a second set of parameters, the first set of parameters indicating properties of the picture of HDR video, and the second set of parameters indicating preferences for the content mastering;
a video decoder configured to decode the encoded data, and thereby produce base sample values; and
a composer configured to adjust the base sample values according to the first set of parameters, and thereby reconstruct the sample values of the picture of HDR video.

16. The computer system of claim 1, wherein the renderer is further configured to:
determine capabilities of the display device, wherein the capabilities of the display device include one or more of:
color primary values of the display device;
peak brightness of the display device;
reference white point of the display device;
maximum frame average light level of the display device; and
desired black level of the display device;
receive a set of parameters that indicate preferences for the content mastering, the set of parameters including:
a lens flare style or type for a lens flare operator;
a lens flare intensity, size, and/or density for the lens flare operator;
a strength value, size, and/or density for the energy-preserving operator;
a tone mapping operator selected from among multiple available tone mapping operators; and
a color gamut remapping operator selected from among multiple available color gamut remapping operators; and
adjust the content mastering based at least in part on the capabilities of the display device and the set of parameters that indicate preferences for the content mastering.

17. The computer system of claim 1, wherein the threshold exceeds a peak brightness of the display device.

18. The computer system of claim 1, wherein the threshold exceeds a peak brightness of the display device, and the energy-preserving operator is not applied to those sample values of the picture of HDR video having intensity above the peak brightness of the display device but below the threshold.

19. The computer system of claim 1, wherein the sample values of the picture of HDR video after the reconstruction span a greater dynamic range than the received encoded data.

20. In a computer system that implements a video playback system, a method comprising:
receiving encoded data for a picture of high dynamic range ("HDR") video and metadata;
using the encoded data and at least some of the metadata to reconstruct sample values of the picture of HDR video; and
performing content mastering on the sample values of the picture of HDR video, including:
identifying high-intensity values from among input values for the sample values of the picture of HDR video, each of the high-intensity values satisfying a threshold; and
applying an energy-preserving operator to blur the identified high-intensity values, wherein the energy-preserving operator spreads energy of the identified high-intensity values to neighboring values, and wherein the applying the energy-preserving operator comprises:
extracting an overflow value indicating excess energy above the threshold for a given one of the identified high-intensity values;
spreading the excess energy over an area adjacent to the given identified high-intensity value to obtain adjustment values; and
merging the adjustment values into the picture of HDR video.

21. The method of claim 20, wherein the sample values of the picture of HDR video are in an HDR video format, and wherein, after the encoded data and the at least some of the metadata are used to reconstruct the sample values of the picture of HDR video, the sample values of the picture of HDR video have a full range of brightness for the HDR video format.

22. The method of claim 20, wherein the performing content mastering further includes applying a lens flare operator to one or more of the sample values of the picture of HDR video, and the received metadata includes a syntax element indicating a lens flare density for the lens flare operator.

23. One or more computer-readable media storing computer-executable instructions for causing one or more processing units, when programmed thereby, to perform operations comprising:
receiving encoded data for a picture of high dynamic range ("HDR") video and metadata;
using the encoded data and at least some of the metadata to reconstruct sample values of the picture of HDR video; and
performing content mastering on the sample values of the picture of HDR video, including:
identifying high-intensity values from among input values for the sample values of the picture of HDR video, each of the high-intensity values satisfying a threshold; and
applying an energy-preserving operator to blur the identified high-intensity values, wherein the energy-preserving operator spreads energy of the identified high-intensity values to neighboring values, and wherein the applying the energy-preserving operator comprises:
extracting overflow values indicating excess energy above the threshold for corresponding ones of the identified high-intensity values;
spreading the excess energy of the overflow values over areas adjacent to the corresponding ones of the identified high-intensity values; and
merging the spread energy into the picture of HDR video.

24. The one or more computer-readable media of claim 23, wherein the metadata includes a brightness bias for exposure correction, the brightness bias indicating a per-shot adjustment to brightness.

25. The one or more computer-readable media of claim 23, wherein the content mastering further comprises:
 identifying a peak brightness of the display device; and
 setting the threshold based at least in part on the peak brightness of the display device.

26. The one or more computer-readable media of claim 23, wherein an intermediate picture includes the overflow values, and wherein the spreading the excess energy of the overflow values includes:
 applying a filter to the overflow values, thereby changing at least some values adjacent the overflow values to be non-zero, wherein the filtered overflow values and changed adjacent values determine adjustment values to be merged into the picture of HDR video.

27. The one or more computer-readable media of claim 23, wherein the metadata includes syntax elements that indicate:
 a multiplier for the threshold used to identify the high-intensity values; and/or
 a strength value for the energy-preserving operator, a size for the energy-preserving operator, and/or a density for the energy-preserving operator.

* * * * *